US007566268B2

(12) United States Patent
Asher et al.

(10) Patent No.: US 7,566,268 B2
(45) Date of Patent: Jul. 28, 2009

(54) ROULETTE GAME BASED ON RESULTS FROM A SPORTING EVENT

(75) Inventors: Joseph M. Asher, New York, NY (US); Howard W. Lutnick, New York, NY (US)

(73) Assignee: CFPH, L.L.C., New York, NY (US)

( * ) Notice: Subject to any disclaimer, the term of this patent is extended or adjusted under 35 U.S.C. 154(b) by 0 days.

(21) Appl. No.: 11/623,933

(22) Filed: Jan. 17, 2007

(65) Prior Publication Data

US 2007/0184888 A1 Aug. 9, 2007

Related U.S. Application Data

(62) Division of application No. 10/836,975, filed on Apr. 29, 2004.

(51) Int. Cl.
*A63F 13/00* (2006.01)
*A63F 13/12* (2006.01)

(52) U.S. Cl. .............................. 463/17; 463/16; 463/42

(58) Field of Classification Search ................... 463/16, 463/1, 6, 17, 22, 25, 28, 40–41, 42
See application file for complete search history.

(56) References Cited

U.S. PATENT DOCUMENTS 4,248,458 A 2/1981 Brody
4,540,174 A 9/1985 Coppock
4,569,526 A 2/1986 Hamilton
4,666,160 A 5/1987 Hamilton
4,695,053 A 9/1987 Vazquez, Jr. et al.
4,856,788 A 8/1989 Fischel
4,874,177 A 10/1989 Girardin
4,883,636 A 11/1989 Fantle, Jr.
4,935,748 A 6/1990 Schmidt et al.
4,962,950 A 10/1990 Champion
5,518,239 A 5/1996 Johnston
5,524,888 A 6/1996 Heidel
5,586,937 A 12/1996 Menashe
5,683,090 A 11/1997 Zeile et al.
5,713,793 A 2/1998 Holte
5,743,525 A 4/1998 Haddad
5,749,785 A 5/1998 Rossides
5,782,470 A 7/1998 Langan (Continued)

FOREIGN PATENT DOCUMENTS

EP 1 139245 AI 10/2001

(Continued)

OTHER PUBLICATIONS

Notice of Allowance for U.S. Appl. No. 10/836,958; 8 pages; Oct. 6, 2008.

(Continued)

*Primary Examiner*—Dmitry Suhol
*Assistant Examiner*—Damon J. Pierce
(74) *Attorney, Agent, or Firm*—Glen R. Farbanish

(57) ABSTRACT

An input, such as a result of a roulette spin, to a roulette game is determined from one or more event results from a sporting event. A result of the roulette game is based at least on the determined input.

54 Claims, 7 Drawing Sheets

| GAME INPUT 34 | NUMBER OF HORSES IN RACE | EXAMPLE RULES 36 FOR DETERMINING GAME INPUTS 34 FROM EVENT RESULTS 32 |
|---|---|---|
| SINGLE ROLL OF TWO DICE, INDIVIDUAL DIE RESULTS | 12 | USING THE WINNING HORSE FOR DIE #1, AND THE SECOND PLACE HORSE FOR DIE #2:<br>IF WINNING HORSE IS HORSE 1 OR 2, DIE #1 = 1;<br>IF WINNING HORSE IS HORSE 3 OR 4, DIE #1 = 2;<br>IF WINNING HORSE IS HORSE 5 OR 6, DIE #1 = 3;<br>IF WINNING HORSE IS HORSE 7 OR 8, DIE #1 = 4;<br>IF WINNING HORSE IS HORSE 9 OR 10, DIE #1 = 5;<br>IF WINNING HORSE IS HORSE 11 OR 12, DIE #1 = 6;<br>IF SECOND PLACE HORSE IS HORSE 1 OR 2, DIE #2 = 1;<br>IF SECOND PLACE HORSE IS HORSE 3 OR 4, DIE #2 = 2;<br>IF SECOND PLACE HORSE IS HORSE 5 OR 6, DIE #2 = 3;<br>IF SECOND PLACE HORSE IS HORSE 7 OR 8, DIE #2 = 4;<br>IF SECOND PLACE HORSE IS HORSE 9 OR 10, DIE #2 = 5;<br>IF SECOND PLACE HORSE IS HORSE 11 OR 12, DIE #2 = 6. |
| SINGLE ROLL OF TWO DICE, INDIVIDUAL DIE RESULTS | 8 | DIE #1 = THE NUMBER OF THE HIGHEST FINISHING HORSE THAT IS NOT HORSE 7 OR 8.<br>FOR DIE #2, LOOK AT THE HORSE FINISHING NEXT AFTER THE HORSE USED FOR DIE #1:<br>IF THAT HORSE IS HORSE 1, DIE #2 = 1;<br>IF THAT HORSE IS HORSE 2, DIE #2 = 2;<br>IF THAT HORSE IS HORSE 3, DIE #2 = 3;<br>IF THAT HORSE IS HORSE 4, DIE #2 = 4;<br>IF THAT HORSE IS HORSE 5, DIE #2 = 5;<br>IF THAT HORSE IS HORSE 6, DIE #2 = 6;<br>IF THAT HORSE IS HORSE 7, DIE #2 = SAME AS DIE #1;<br>IF THAT HORSE IS HORSE 8, REPEAT THE PROCESS FOR DIE #2 USING THE NEXT FINISHING HORSE. |
| SINGLE ROLL OF TWO DICE, COMBINED TOTAL OF DICE | 12 | IF HORSE 1-11 IS THE WINNING HORSE, THE COMBINED TOTAL OF DICE = NUMBER OF WINNING HORSE + 1;<br>IF HORSE 12 IS THE WINNING HORSE, THE COMBINED TOTAL OF DICE = NUMBER OF SECOND PLACE HORSE + 1. |
| SINGLE ROLL OF TWO DICE, COMBINED TOTAL OF DICE | 8 | THE COMBINED TOTAL OF DICE = THE SUM OF THE NUMBERS OF THE HIGHEST TWO CONSECUTIVELY FINISHING HORSES WHOSE SUM OF THE NUMBERS IS LESS THAN OR EQUAL TO 12. |

U.S. PATENT DOCUMENTS

| | | | |
|---|---|---|---|
| 5,851,010 | A | 12/1998 | Feinberg |
| 5,888,136 | A | 3/1999 | Herbert |
| 6,001,016 | A | 12/1999 | Walker et al. |
| 6,024,641 | A | 2/2000 | Sarno |
| 6,026,383 | A | 2/2000 | Ausubel |
| 6,038,554 | A | 3/2000 | Vig |
| 6,102,797 | A | 8/2000 | Kail |
| 6,110,042 | A | 8/2000 | Walker et al. |
| 6,113,492 | A | 9/2000 | Walker et al. |
| 6,120,376 | A | 9/2000 | Cherry |
| 6,126,543 | A | 10/2000 | Friedman |
| 6,135,881 | A | 10/2000 | Abbott et al. |
| 6,152,822 | A | 11/2000 | Herbert |
| 6,157,918 | A | 12/2000 | Shepherd |
| 6,193,605 | B1 | 2/2001 | Libby et al. |
| 6,296,569 | B1 | 10/2001 | Congello, Jr. |
| 6,309,307 | B1 | 10/2001 | Krause et al. |
| 6,325,721 | B1 | 12/2001 | Miyamoto et al. |
| 6,331,148 | B1 | 12/2001 | Krause et al. |
| 6,343,988 | B1 | 2/2002 | Walker et al. |
| 6,358,150 | B1 | 3/2002 | Mir et al. |
| 6,394,899 | B1 | 5/2002 | Walker |
| 6,421,653 | B1 | 7/2002 | May |
| 6,450,887 | B1 | 9/2002 | Mir et al. |
| 6,527,270 | B2 | 3/2003 | Maksymec et al. |
| 6,558,255 | B2 | 5/2003 | Walker et al. |
| 6,616,529 | B1 | 9/2003 | Qian et al. |
| 6,624,641 | B1 | 9/2003 | Krampitz et al. |
| 6,656,042 | B2 | 12/2003 | Reiss et al. |
| 6,663,107 | B2 | 12/2003 | Fisher et al. |
| 6,688,978 | B1 | 2/2004 | Herman |
| 6,709,330 | B1 | 3/2004 | Klein et al. |
| 6,869,360 | B2 | 3/2005 | Marks et al. |
| 6,910,965 | B2 | 6/2005 | Downes |
| 7,040,982 | B1 | 5/2006 | Jarvis et al. |
| 7,094,151 | B2 | 8/2006 | Downes |
| 7,160,189 | B2 | 1/2007 | Walker et al. |
| 7,206,762 | B2 | 4/2007 | Sireau |
| 7,302,412 | B1 | 11/2007 | Speck |
| 7,458,891 | B2 | 12/2008 | Asher et al. |
| 2001/0032169 | A1 | 10/2001 | Sireau |
| 2001/0039209 | A1 | 11/2001 | DeWeese et al. |
| 2002/0032644 | A1 | 3/2002 | Corby et al. |
| 2002/0073021 | A1 | 6/2002 | Ginsberg et al. |
| 2002/0087447 | A1 | 7/2002 | McDonald et al. |
| 2002/0115488 | A1 | 8/2002 | Berry et al. |
| 2002/0147047 | A1 | 10/2002 | Letovsky et al. |
| 2002/0151340 | A1* | 10/2002 | Guinn et al. .................. 463/16 |
| 2002/0151363 | A1 | 10/2002 | Letovsky et al. |
| 2002/0198044 | A1 | 12/2002 | Walker et al. |
| 2002/0198052 | A1* | 12/2002 | Soltys et al. .................. 463/42 |
| 2003/0046218 | A1 | 3/2003 | Albanese et al. |
| 2003/0054875 | A1 | 3/2003 | Marks et al. |
| 2003/0109300 | A1 | 6/2003 | Walker et al. |
| 2003/0157976 | A1 | 8/2003 | Simon et al. |
| 2003/0178775 | A1 | 9/2003 | Fisher et al. |
| 2003/0190941 | A1 | 10/2003 | Byrne |
| 2003/0195029 | A1* | 10/2003 | Frohm et al. .................. 463/16 |
| 2003/0195841 | A1 | 10/2003 | Ginsberg et al. |
| 2003/0199315 | A1 | 10/2003 | Downes |
| 2003/0216170 | A1 | 11/2003 | Walker et al. |
| 2003/0220134 | A1 | 11/2003 | Walker et al. |
| 2003/0224847 | A1 | 12/2003 | Jaimet |
| 2004/0029627 | A1 | 2/2004 | Hannan et al. |
| 2004/0048656 | A1 | 3/2004 | Krynicky |
| 2004/0166918 | A1 | 8/2004 | Walker et al. |
| 2004/0166942 | A1 | 8/2004 | Muir |
| 2004/0176159 | A1 | 9/2004 | Walker et al. |
| 2004/0176994 | A1 | 9/2004 | Fine et al. |
| 2004/0204229 | A1 | 10/2004 | Walker et al. |
| 2004/0204232 | A1 | 10/2004 | Asher et al. |
| 2004/0210507 | A1 | 10/2004 | Asher et al. |
| 2004/0214629 | A1 | 10/2004 | Walker et al. |
| 2004/0224770 | A1 | 11/2004 | Wolf et al. |
| 2005/0026670 | A1* | 2/2005 | Lardie ......................... 463/16 |
| 2005/0027643 | A1 | 2/2005 | Amaitis et al. |
| 2005/0043078 | A1 | 2/2005 | Sundstrom |
| 2005/0059467 | A1 | 3/2005 | Saffari et al. |
| 2005/0085288 | A1* | 4/2005 | Schugar et al. ................ 463/16 |
| 2005/0119962 | A1 | 6/2005 | Bowen et al. |
| 2005/0197938 | A1 | 9/2005 | Davie et al. |
| 2005/0197939 | A1 | 9/2005 | Davie et al. |
| 2005/0197948 | A1 | 9/2005 | Davie et al. |
| 2005/0208996 | A1* | 9/2005 | Friedman ..................... 463/25 |
| 2005/0245306 | A1 | 11/2005 | Asher et al. |
| 2005/0245308 | A1 | 11/2005 | Amaitis et al. |
| 2005/0245310 | A1 | 11/2005 | Amaitis et al. |
| 2006/0105839 | A1 | 5/2006 | Graeve et al. |
| 2006/0105840 | A1 | 5/2006 | Graeve |
| 2007/0111777 | A1 | 5/2007 | Amaitis et al. |
| 2007/0117624 | A1 | 5/2007 | Amaitis et al. |
| 2007/0123336 | A1 | 5/2007 | Amaitis et al. |
| 2007/0129138 | A1 | 6/2007 | Amaitis et al. |
| 2007/0184892 | A1 | 8/2007 | Asher et al. |
| 2007/0187889 | A1 | 8/2007 | Asher et al. |
| 2007/0191085 | A1 | 8/2007 | Asher et al. |
| 2008/0032778 | A1 | 2/2008 | Amaitis et al. |

FOREIGN PATENT DOCUMENTS

| | | |
|---|---|---|
| EP | 1 234606 AI | 8/2002 |
| GB | 1574447 | 9/1980 |
| GB | 2180675 | 4/1987 |
| GB | 2299425 | 10/1996 |
| WO | WO 98/04991 | 2/1998 |
| WO | WO 99/60498 | 11/1999 |
| WO | WO 00/79442 | 12/2000 |
| WO | WO 01/77964 | 10/2001 |
| WO | WO 01/86532 AI | 11/2001 |
| WO | WO 2004/079671 A2 | 9/2004 |
| WO | WO 2005/065065 A2 | 7/2005 |

OTHER PUBLICATIONS

U.S. PTO Office Action for U.S. Appl. No. 10/836,975; 25 pages; Nov. 20, 2008.

U.S. PTO Office Action for U.S. Appl. No. 11/623,901; 14 pages; Dec. 24, 2008.

U.S. PTO Office Action for U.S. Appl. No. 11/623,943; 27 pages; Jan. 6, 2009.

Pending U.S. Appl. No. 10/836,958 entitled, "System and Methods for Par-Imutuel Gaming Based on Sporting Events Results", by Joseph Asher, et. al., 54 pages.

Pending U.S. Appl. No. 10/836,975 entitled, "System and Methods for Mapping Results From Sporting Events to Game Inputs", by Joseph Asher, et. al., 54 pages.

Pending U.S. Appl. No. 11/623,901 entitled, "A Card Game Based on Results From a Sporting Event", by Joseph Asher, et. al., 31 pages.

Pending U.S. Appl. No. 11/623,908 entitled, "Craps Game Based on Results From a Sporting Event", by Joseph Asher, et. al., 32 pages.

Pending U.S. Appl. No. 11/623,943 entitled, "Slots Game Based on Results From a Sporting Event", by Joseph Asher, et. al., 32 pages.

U.S Patent Office Action for U.S. Appl. No. 10/836,958, filed Apr. 29, 2004 in the name of Joseph Asher; 23 pages, Mar. 7, 2008.

U.S Patent Office Action for U.S. Appl. No. 10/836,975, filed Apr. 29, 2004 in the name of Joseph Asher; 34 pages, Aug. 31, 2007.

U.S Patent Office Action for U.S. Appl. No. 11/623,901, filed Jan. 17, 2007 in the name of Joseph Asher; 19 pages, Mar. 12, 2008.

U.S Patent Office Action for U.S. Appl. No. 11/623,908, filed Jan. 17, 2007 in the name of Joseph Asher; 18 pages, Feb. 4, 2008.

U.S Patent Office Action for U.S. Appl. No. 11/623,943, filed Jan. 17, 2007 in the name of Joseph Asher; 22 pages, Mar. 17, 2008.

International Searching Report for International Application No. PCT/US05/15004; 2 pages, Sep. 8, 2006.

Written Opinion of the International Searching Authority for International Application No. PCT/US05/15004; 3 pages, Oct. 29, 2006.
International Search Report for International Application No. PCT/US05/14667; 3 pages, Jun. 21, 2007.
Written Opinion of the International Searching Authority for International Application No. PCT/US05/14667; 7 pages, Apr. 20, 2007.
Marhsall Fey, "Slot Machines, A Pictorial History of the 1st 100 years," 5th Edition, Liberty Belle Books, 1983, pp. 59-60 & 168.
U.S. Patent Office Action for U.S. Appl. No. 10/836,975, filed Apr. 29, 2004 in the name of Joseph Asher; 29 pages, Feb. 9, 2007.
"The Basics of Horseplay," NTRA.com, http://www.ntra.com/news.asp?type=playthehorses&id=4795, 2 pages.
"Bet with the People Who Know Racing," Racing Daily Forum, 15 pages; Jul. 24, 2001.
"NTRA All Star Jockey Championship Special Wagers," 3 pages.
"Wagering Information: Straight or Basic Wagers," Lone Star Park at Grand Prairie: Players Guide, http://www.lonestarpark.com/bet_info.asp; 3 pages.
"Wagering Information; Straight or Basic Wagers," NTRA.com, http://www.ntra.com/news.asp?type=playthehorses&id=4799, 3 pages.
"Glossary of terms," NTRA.com, http:www.ntra.com/news.asp?type=playthehorses&id=4797, 3 pages.
"Quote of the Day, Bet of the Day," London Times; 1 page; Jul. 30, 2003.
U.S. Appl. No. 12/032,141, filed Feb. 15, 2008, Alderucci et al.
U.S. Appl. No. 12/032,160, filed Feb. 15, 2008, Alderucci et al.
U.S. Appl. No. 10/836,077, filed Apr. 29, 2004, Amaitis et al.
U.S. Appl. No. 11/841,049, filed Aug. 20, 2007, Amaitis et al.
U.S. Appl. No. 11/018,978, filed Dec. 21, 2004, Amaitis et al.
U.S. Appl. No. 11/963,088, filed Dec. 21, 2007, Amaitis et al.
U.S. Appl. No. 11/963,158, filed Dec. 21, 2007, Amaitis et al.
Random Walk Theory; http://www.streetauthority.com/tenns/r/random-walk-theory.asp; 3 pages; date unknown.
Welcome to binarybet.com; binarybet.com; 1 page; Date: 2003.
What is a Binary Bet?; binarybet.com; 1 page; Date: 2003.
Frequently Asked Questions; binarybet.com; 1 page; Date: 2003.
United States Patent and Trademark Office; Office Action for U.S. Appl. No. 10/654,280, filed Sep. 3, 2003 in the name of Joseph M. Asher; 9 pages; Date: Apr. 7, 2005.
Fixed Odds Financial Betting; http://web.archive.org/web/20020329110541/http://betonmarkets.corn/; 2 pages; May 10, 2005.
United States Patent and Trademark Office; Office Action for U.S. Appl. No. 10/836,077, filed Apr. 29, 2004 in the name of Lee M. Amaitis; 5 pages; Date: Jun. 28, 2007.
United States Patent and Trademark Office; Office Action for U.S. Appl. No. 10/794,666, filed Mar. 5, 2004 in the name of Christopher John Davie; 6 pages; Date: Sep. 27, 2007.
United States Patent and Trademark Office; Office Action for U.S. Appl. No. 11/536,094, filed Sep. 28, 2006 in the name of Lee M. Amaitis; 24 pages; Date: Oct. 25, 2007.
United States Patent and Trademark Office; Office Action for U.S. Appl. No. 11/535,662, filed Sep. 27, 2006 in the name of Lee M. Amaitis; 12 pages; Date: Nov. 1, 2007.
United States Patent and Trademark Office; Office Action for U.S. Appl. No. 10/795,163, filed Mar. 5, 2004 in the name of Christopher John Davie; 11 pages; Date: Mar. 13, 2008.
United States Patent and Trademark Office; Office Action for U.S. Appl. No. 11/745,573, filed May 8, 2007 in the name of Joseph M. Asher; 8 pages; Date: Apr. 10, 2008.
Australian Examiner's Report for Application 2004227808; 2 pages; Date: May 16, 2008.
United States Patent and Trademark Office; Office Action for U.S. Appl. No. 10/794,666, filed Mar. 5, 2004 in the name of Christopher John Davie; 11 pages; Date: May 28, 2008.
United States Patent and Trademark Office; Advisory Action for U.S. Appl. No. 10/836,077, filed Apr. 29, 2004 in the name of Lee M. Amaitis; 2 pages; Date: Jun. 3, 2008.
United States Patent and Trademark Office; Advisory Action for U.S. Appl. No. 11/018,978, filed Dec. 21, 2004 in the name of Lee M. Amaitis; 3 pages; Date: Jul. 12, 2007.
United States Patent and Trademark Office; Office Action for U.S. Appl. No. 11/018,978, filed Dec. 21, 2004 in the name of Lee M. Amaitis; 6 pages; Date: May 14, 2008.
Ozgit, A.; Performance Based Sports Derivatives: A New Instrument; Chapter 3; pp. 83-121 . Date Unknown.
Sauer, Raymond D.; The Economics of Wagering Markets; Journal of Economic Literature; vol. 36, No. 4; pp. 2021-2064; Date: Dec. 1998.
The Patent Office Search Report for International Application No. GB 0320232.2; 6 pages; Date:Dec. 17, 2003.
TradeSports Trading & Betting Exchange, Best Lines & Bonuses, What is Tradesports?; www.tradesports.com; 2 pages; Date: Apr. 27, 2004.
Savage, Sam L.: Prices, Probabilities and Predictions; ORIMS Today; 10 pages; Date: Jun. 2004.
United States Patent and Trademark Office; Office Action for U.S. Appl. No. 10/654,280, filed Sep. 3, 2003 in the name of Joseph M. Asher; 17 pages; Date: Jul. 13, 2005.
United States Patent and Trademark Office; Office Action for U.S. Appl. No. 10/654,280, filed Sep. 3, 2003 in the name of Joseph M. Asher; 11 pages; Date: Jan. 12, 2006.
United States Patent and Trademark Office; Notice ofAllowance and Fee(s) Due for U.S. Appl. No. 10/654,280, filed Sep. 3, 2003 in the name of Joseph M. Asher; 9 pages; Date: Jan. 25, 2007.
United States Patent and Trademark Office; Office Action for U.S. Appl. No. 10/836,077, filed Apr. 29, 2004 in the name of Lee M. Amaitis; 17 pages; Date: Aug. 22, 2007.
United States Patent and Trademark Office; Office Action for U.S. Appl. No. 10/836,077, filed Apr. 29, 2004 in the name of Lee M. Amaitis; 11 pages; Date: Mar. 14, 2008.
United States Patent and Trademark Office; Office Action for U.S. Appl. No. 11/018,978, filed Dec. 21, 2004 in the name of Lee M. Amaitis; 14 pages; Date: May 18, 2006.
United States Patent and Trademark Office; Office Action for U.S. Appl. No. 11/018,978, filed Dec. 21, 2004 in the name of Lee M. Amaitis; 15 pages; Date: Apr. 25, 2007.
U.S. Appl. No. 11/745,573, filed May 8, 2007, Asher et al.
U.S. Appl. No. 11/745,646, filed May 8, 2007, Asher et al.
U.S. Appl. No. 10/836,999, filed Apr. 29, 2004, Amaitis et al.
U.S. Appl. No. 10/654,280, filed Sep. 3, 2003, Asher et al.
U.S. Appl. No. 10/794,666, filed Mar. 5, 2004, Davie, et al.
U.S. Appl. No. 10/794,668, filed Mar. 5, 2004, Davie, et al.
U.S. Appl. No. 10/795,163, filed Mar. 5, 2004, Davie, et al.
United States Patent and Trademark Office; Office Action for U.S. Appl. No. 11/018,978, filed Dec. 21, 2004 in the name of Lee M. Amaitis; 12 pages; Date: Aug. 17, 2007.
USPTO Office Action for U.S. Appl. No. 10/836,077, filed Oct. 28, 2008 (11 pages).
USPTO Office Action for U.S. Appl. No. 11/841,049, filed Nov. 26, 2008 (7 pages).

* cited by examiner

90

| | GAME (92) | EXAMPLE GAME INPUTS 34 (94) |
|---|---|---|
| 96 | CRAPS | INDIVIDUAL DIE ROLL |
| | | COMBINED ROLL OF TWO DICE |
| 96 | CARD GAMES (FOR EXAMPLE, BLACKJACK, POKER, BACCARAT, PAI GOW POKER, POKER, WAS, HOLD 'EM) | VALUE OF ONE OR MORE CARDS DEALT FROM THE DECK |
| | | SUIT OF ONE OR MORE CARDS DEALT FROM THE DECK |
| 96 | SLOTS | SPIN OF A SINGLE SLOT MACHINE REEL |
| | | COMBINATION OF SPIN OF MULTIPLE SLOT MACHINE REELS |
| 96A | ROULETTE | RESULT OF A SPIN: SINGLE NUMBER FROM 1-36 OR 0 OR 00 |
| | | RESULT OF A SPIN: BLACK, RED, OR GREEN |
| 96 | MONEY WHEEL | RESULT OF A SPIN OF THE MONEY WHEEL |
| 96 | KENO | NUMBER OF BALL SELECTED FROM HOPPER |

*FIG. 2*

| GAME INPUT 34 | NUMBER OF HORSES IN RACE | EXAMPLE RULES 36 FOR DETERMINING GAME INPUTS 34 FROM EVENT RESULTS 32 |
|---|---|---|
| TOTAL VALUE OF CARDS IN USER'S HAND | 12 | FOR EACH BET 26, THE TOTAL VALUE OF CARDS IN THE USER'S HAND = THE SUM OF THE NUMBERS OF THE HORSES FINISHING IN THE SELECTED FINISHING POSITIONS 31 FOR THAT BET 26 |
| TOTAL VALUE OF CARDS IN USER'S HAND | 8 | FOR EACH BET 26, THE TOTAL VALUE OF CARDS IN THE USER'S HAND = THE SUM OF THE NUMBERS OF THE HORSES FINISHING IN THE SELECTED FINISHING POSITIONS 31 FOR THAT BET 26 |

*FIG. 4*

| GAME INPUT 34 | NUMBER OF HORSES IN RACE | EXAMPLE RULES 36 FOR DETERMINING GAME INPUTS 34 FROM EVENT RESULTS 32 |
|---|---|---|
| SINGLE ROLL OF TWO DICE, INDIVIDUAL DIE RESULTS | 12 | USING THE WINNING HORSE FOR DIE #1, AND THE SECOND PLACE HORSE FOR DIE #2:<br>IF WINNING HORSE IS HORSE 1 OR 2, DIE #1 = 1;<br>IF WINNING HORSE IS HORSE 3 OR 4, DIE #1 = 2;<br>IF WINNING HORSE IS HORSE 5 OR 6, DIE #1 = 3;<br>IF WINNING HORSE IS HORSE 7 OR 8, DIE #1 = 4;<br>IF WINNING HORSE IS HORSE 9 OR 10, DIE #1 = 5;<br>IF WINNING HORSE IS HORSE 11 OR 12, DIE #1 = 6;<br>IF SECOND PLACE HORSE IS HORSE 1 OR 2, DIE #2 = 1;<br>IF SECOND PLACE HORSE IS HORSE 3 OR 4, DIE #2 = 2;<br>IF SECOND PLACE HORSE IS HORSE 5 OR 6, DIE #2 = 3;<br>IF SECOND PLACE HORSE IS HORSE 7 OR 8, DIE #2 = 4;<br>IF SECOND PLACE HORSE IS HORSE 9 OR 10, DIE #2 = 5;<br>IF SECOND PLACE HORSE IS HORSE 11 OR 12, DIE #2 = 6. |
| SINGLE ROLL OF TWO DICE, INDIVIDUAL DIE RESULTS | 8 | DIE #1 = THE NUMBER OF THE HIGHEST FINISHING HORSE THAT IS NOT HORSE 7 OR 8.<br>FOR DIE #2, LOOK AT THE HORSE FINISHING NEXT AFTER THE HORSE USED FOR DIE #1:<br>IF THAT HORSE IS HORSE 1, DIE #2 = 1;<br>IF THAT HORSE IS HORSE 2, DIE #2 = 2;<br>IF THAT HORSE IS HORSE 3, DIE #2 = 3;<br>IF THAT HORSE IS HORSE 4, DIE #2 = 4;<br>IF THAT HORSE IS HORSE 5, DIE #2 = 5;<br>IF THAT HORSE IS HORSE 6, DIE #2 = 6;<br>IF THAT HORSE IS HORSE 7, DIE #2 = SAME AS DIE #1;<br>IF THAT HORSE IS HORSE 8, REPEAT THE PROCESS FOR DIE #2 USING THE NEXT FINISHING HORSE. |
| SINGLE ROLL OF TWO DICE, COMBINED TOTAL OF DICE | 12 | IF HORSE 1-11 IS THE WINNING HORSE, THE COMBINED TOTAL OF DICE = NUMBER OF WINNING HORSE + 1;<br>IF HORSE 12 IS THE WINNING HORSE, THE COMBINED TOTAL OF DICE = NUMBER OF SECOND PLACE HORSE + 1. |
| SINGLE ROLL OF TWO DICE, COMBINED TOTAL OF DICE | 8 | THE COMBINED TOTAL OF DICE = THE SUM OF THE NUMBERS OF THE HIGHEST TWO CONSECUTIVELY FINISHING HORSES WHOSE SUM OF THE NUMBERS IS LESS THAN OR EQUAL TO 12. |

*FIG. 3*

| GAME INPUT 34 | NUMBER OF HORSES IN RACE | EXAMPLE RULES 36 FOR DETERMINING GAME INPUTS 34 FROM EVENT RESULTS 32 |
|---|---|---|
| VALUE OF NEXT CARD DEALT FROM DECK | 12 | DETERMINE THE SUM OF THE NUMBERS OF THE HIGHEST THREE CONSECUTIVELY FINISHING HORSES WHOSE SUM OF THE NUMBERS IS LESS THAN OR EQUAL TO 31:<br>IF THE SUM IS 6-7, CARD VALUE = A;<br>IF THE SUM IS 8-9, CARD VALUE = 2;<br>IF THE SUM IS 10-11, CARD VALUE = 3;<br>IF THE SUM IS 12-13, CARD VALUE = 4;<br>IF THE SUM IS 14-15, CARD VALUE = 5;<br>IF THE SUM IS 16-17, CARD VALUE = 6;<br>IF THE SUM IS 18-19, CARD VALUE = 7;<br>IF THE SUM IS 20-21, CARD VALUE = 8;<br>IF THE SUM IS 22-23, CARD VALUE = 9;<br>IF THE SUM IS 24-25, CARD VALUE = 10;<br>IF THE SUM IS 26-27, CARD VALUE = J;<br>IF THE SUM IS 28-29, CARD VALUE = Q;<br>IF THE SUM IS 30-31, CARD VALUE = K. |
| VALUE OF NEXT CARD DEALT FROM DECK | 8 | DETERMINE THE SUM OF THE NUMBERS OF THE TOP TWO FINISHING HORSES:<br>IF THE SUM IS 3, CARD VALUE = A;<br>IF THE SUM IS 4, CARD VALUE = 2;<br>IF THE SUM IS 5, CARD VALUE = 3;<br>IF THE SUM IS 6, CARD VALUE = 4;<br>IF THE SUM IS 7, CARD VALUE = 5;<br>IF THE SUM IS 8, CARD VALUE = 6;<br>IF THE SUM IS 9, CARD VALUE = 7;<br>IF THE SUM IS 10, CARD VALUE = 8;<br>IF THE SUM IS 11, CARD VALUE = 9;<br>IF THE SUM IS 12, CARD VALUE = 10;<br>IF THE SUM IS 13, CARD VALUE = J;<br>IF THE SUM IS 14, CARD VALUE = Q;<br>IF THE SUM IS 15, CARD VALUE = K. |
| SUIT OF NEXT CARD DEALT FROM DECK | 12 | IF SECOND PLACE HORSE IS HORSE 1-3, SUIT = HEARTS;<br>IF SECOND PLACE HORSE IS HORSE 4-6, SUIT = DIAMONDS;<br>IF SECOND PLACE HORSE IS HORSE 7-9, SUIT = CLUBS;<br>IF SECOND PLACE HORSE IS HORSE 10-12, SUIT = SPADES. |
| SUIT OF NEXT CARD DEALT FROM DECK | 8 | IF SECOND PLACE HORSE IS HORSE 1-2, SUIT = HEARTS;<br>IF SECOND PLACE HORSE IS HORSE 3-4, SUIT = DIAMONDS;<br>IF SECOND PLACE HORSE IS HORSE 5-6, SUIT = CLUBS;<br>IF SECOND PLACE HORSE IS HORSE 7-8, SUIT = SPADES. |

*FIG. 5*

*FIG. 6A*

| GAME INPUT 34 | NUMBER OF HORSES IN RACE | EXAMPLE RULES 36 FOR DETERMINING GAME INPUTS 34 FROM EVENT RESULTS 32 |
|---|---|---|
| SINGLE SPIN OF THREE REELS | 12 | EACH BET 26 DEFINES THREE SELECTED FINISHING POSITIONS 31. FOR EACH BET 26:<br>1. DETERMINE THE NUMBER OF THE HORSE FINISHING IN THE FIRST SELECTED FINISHING POSITION 31:<br>- IF THAT HORSE IS HORSE 1 OR 2, FIRST REEL = CHERRY;<br>- IF THAT HORSE IS HORSE 3 OR 4, FIRST REEL = BLANK;<br>- IF THAT HORSE IS HORSE 5 OR 6, FIRST REEL = LEMON;<br>- IF THAT HORSE IS HORSE 7 OR 8, FIRST REEL = BLANK;<br>- IF THAT HORSE IS HORSE 9 OR 10, FIRST REEL = ORANGE;<br>- IF THAT HORSE IS HORSE 11 OR 12, FIRST REEL = BAR.<br>2. DETERMINE THE NUMBER OF THE HORSE FINISHING IN THE SECOND SELECTED FINISHING POSITION 31:<br>- IF THAT HORSE IS HORSE 1 OR 2, SECOND REEL = BAR;<br>- IF THAT HORSE IS HORSE 3 OR 4, SECOND REEL = CHERRY;<br>- IF THAT HORSE IS HORSE 5 OR 6, SECOND REEL = BLANK;<br>- IF THAT HORSE IS HORSE 7 OR 8, SECOND REEL = LEMON;<br>- IF THAT HORSE IS HORSE 9 OR 10, SECOND REEL = BLANK;<br>- IF THAT HORSE IS HORSE 11 OR 12, SECOND REEL = ORANGE.<br>3. DETERMINE THE NUMBER OF THE HORSE FINISHING IN THE THIRD SELECTED FINISHING POSITION 31:<br>- IF THAT HORSE IS HORSE 1 OR 2, THIRD REEL = ORANGE;<br>- IF THAT HORSE IS HORSE 3 OR 4, THIRD REEL = BAR;<br>- IF THAT HORSE IS HORSE 5 OR 6, THIRD REEL = CHERRY;<br>- IF THAT HORSE IS HORSE 7 OR 8, THIRD REEL = BLANK;<br>- IF THAT HORSE IS HORSE 9 OR 10, THIRD REEL = LEMON;<br>- IF THAT HORSE IS HORSE 11 OR 12, THIRD REEL = BLANK. |
| | | |

TO FIG. 6B

*FROM FIG. 6A*

| | | |
|---|---|---|
| SINGLE SPIN OF THREE REELS | 8 | EACH BET 26 DEFINES THREE SELECTED FINISHING POSITIONS 31. FOR EACH BET 26:<br>1. DETERMINE THE NUMBER OF THE HORSE FINISHING IN THE FIRST SELECTED FINISHING POSITION 31:<br>- IF THAT HORSE IS HORSE 1, FIRST REEL = CHERRY;<br>- IF THAT HORSE IS HORSE 2, FIRST REEL = BLANK;<br>- IF THAT HORSE IS HORSE 3, FIRST REEL = LEMON;<br>- IF THAT HORSE IS HORSE 4, FIRST REEL = BLANK;<br>- IF THAT HORSE IS HORSE 5, FIRST REEL = LEMON;<br>- IF THAT HORSE IS HORSE 6, FIRST REEL = BLANK;<br>- IF THAT HORSE IS HORSE 7, FIRST REEL = BAR;<br>- IF THAT HORSE IS HORSE 8, FIRST REEL = BLANK.<br>2. DETERMINE THE NUMBER OF THE HORSE FINISHING IN THE SECOND SELECTED FINISHING POSITION 31:<br>- IF THAT HORSE IS HORSE 1, SECOND REEL = BLANK;<br>- IF THAT HORSE IS HORSE 2, SECOND REEL = CHERRY;<br>- IF THAT HORSE IS HORSE 3, SECOND REEL = BLANK;<br>- IF THAT HORSE IS HORSE 4, SECOND REEL = LEMON;<br>- IF THAT HORSE IS HORSE 5, SECOND REEL = BLANK;<br>- IF THAT HORSE IS HORSE 6, SECOND REEL = LEMON;<br>- IF THAT HORSE IS HORSE 7, SECOND REEL = BLANK;<br>- IF THAT HORSE IS HORSE 8, SECOND REEL = BAR.<br>3. DETERMINE THE NUMBER OF THE HORSE FINISHING IN THE THIRD SELECTED FINISHING POSITION 31:<br>- IF THAT HORSE IS HORSE 1, THIRD REEL = BAR;<br>- IF THAT HORSE IS HORSE 2, THIRD REEL = BLANK;<br>- IF THAT HORSE IS HORSE 3, THIRD REEL = CHERRY;<br>- IF THAT HORSE IS HORSE 4, THIRD REEL = BLANK;<br>- IF THAT HORSE IS HORSE 5, THIRD REEL = LEMON;<br>- IF THAT HORSE IS HORSE 6, THIRD REEL = BLANK;<br>- IF THAT HORSE IS HORSE 7, THIRD REEL = LEMON;<br>- IF THAT HORSE IS HORSE 8, THIRD REEL = BLANK. |

*FIG. 6B*

ROULETTE GAME BASED ON RESULTS FROM A SPORTING EVENT

CROSS REFERENCE TO RELATED APPLICATION

This application is a divisional of co-pending U.S. patent application Ser. No. 10/836,975, filed Apr. 29, 2004, which is hereby incorporated by reference herein in its entirety.

TECHNICAL FIELD OF THE INVENTION

This invention relates in general to gaming systems and methods and, more particularly, to a system and method for mapping results from sporting events to game inputs.

BACKGROUND OF THE INVENTION

Wagering in casinos, online, at racetracks, and at off-track betting ("OTB") parlors is a large and growing industry throughout the world. Various types of betting products and systems exist that facilitate betting on the outcome of a particular game. For example, a patron in a casino or a person using an online betting service may bet on a hand of blackjack, a spin on a slot machine, a roll of the dice, etc. The result of each bet, such as whether the bet is a winning bet, a losing bet, or a "push" (i.e., a tie) is determined based on a number of inputs. For example, inputs for a blackjack game include the cards dealt to each player and the dealer, inputs for a craps game include each roll of the dice, and inputs for a roulette game include the each spin of the roulette wheel. Such inputs are typically determined by chance or by some combination of skill and chance. For example, in a roulette game, each spin of the roulette wheel is determined by chance. However, in a blackjack game, the cards dealt to each player are determined by a combination of skill and chance: the player does not know which cards will be dealt from the deck but has some control over how many cards he wishes to draw for his hand.

In certain games, such as blackjack, craps and roulette, the payout for each winning bet is determined based on odds predetermined by the casino or online betting service provider. For example, in roulette, a winning bet on red or black typically pays 1-1 odds to the bettor, while a winning bet on a single number typically pays 35-1 odds to the bettor. For other types of betting, such as betting on horse races or dog races for example, the payout for each winning bet may be determined in a pari-mutuel manner. In a pari-mutuel betting system, all bets regarding a particular event are aggregated, a commission (or "take-out") is taken by the track, and the remainder is distributed among the winning bettors in proportion to the amount of each winning bet. Pari-mutuel betting systems are commonly used in North America (and other various places throughout the world) for betting on horse races.

SUMMARY OF THE INVENTION

In one embodiment, a method of mapping sporting event results to game inputs is provided. One or more event results of a particular sporting event having a particular number of participants are received, and a set of rules is selected from a plurality of sets of rules based on the particular number of participants in the particular sporting event. For each of a plurality of bets, one or more inputs for a game are determined by applying the selected set of rules to the received one or more event results of the particular sporting event. A result of the game is then determined for each of the plurality of bets based at least on the one or more determined inputs for that bet.

In another embodiment, a method of mapping sporting event results to cards in a card game is provided. One or more event results of a sporting event are received. For each of a plurality of bets, one or more simulated playing cards are determined from a plurality of playing cards by applying a set of rules to the one or more event results from the sporting event. A result of a card game are then determined for each of the plurality of bets based at least on the one or more simulated playing cards determined for that bet.

In yet another embodiment, a method of mapping sporting event results to die rolls is provided. One or more event results of a sporting event are received. For each of a plurality of bets, a result of a simulated first die roll is determined by applying a set of rules to the one or more event results from the sporting event, a result of a simulated second die roll is determined by applying the set of rules to the one or more event results from the sporting event, and a result of a craps game is determined based at least on the determined results of the simulated first die roll and the simulated second die roll.

In yet another embodiment, a method of mapping sporting event results to roulette spins is provided. One or more event results of a sporting event are received. For each of a plurality of bets, the result of a simulated roulette spin is determined by applying a set of rules to the one or more event results from the sporting event, and a result of a roulette game is determined based at least on the determined result of the simulated roulette spin for that bet.

In yet another embodiment, a method of mapping sporting event results to spins of slot machine reels is provided. One or more event results of a sporting event are received. For each of a plurality of bets, a result of a simulated spin of a first slot machine reel is determined by applying a set of rules to a first portion of the one or more event results from the sporting event, a result of a simulated spin of a second slot machine reel is determined by applying the set of rules to a second portion of the one or more event results from the sporting event, and a result of a simulated spin of a third slot machine reel is determined by applying the set of rules to a third portion of the one or more event results from the sporting event. Each of the determined results of the simulated spins of the first, second and third slot machine reels for each bet comprises one of a plurality of slot machine symbols. A result of a slots game is determined for each of the plurality of bets based at least on the determined results of the simulated spins of the first, second and third slot machine reels.

Various embodiments of the present invention may benefit from numerous advantages. It should be noted that one or more embodiments may benefit from some, none, or all of the advantages discussed below.

One advantage is that systems and methods provide bettors pari-mutuel gaming based on sporting event results. Thus, a bettor may place a bet on a game, (such as blackjack, craps or roulette, for example) in which the inputs for the game (such as the cards, dice roll, or roulette spin, for example) are determined based on the results of a sporting event (such as the finishing positions of each horse in a horse race, for example). The amount that the bettor wagers is entered into a pari-mutuel pool that is distributed (at least partially) in a pari-mutuel manner to all winning bettors. A pari-mutuel gaming provider may offer such gaming as an alternative to, or in addition to, traditional pari-mutuel gaming, such as traditional pari-mutuel betting on horse racing.

Another advantage is that such pari-mutuel gaming based on sporting event results may be provided online such that bettors may place bets through one or more websites associated with a betting provider. The, bettors need not travel to a casino, track or OTB parlor to place such bets. Another advantage is that systems and methods provide rules for each game for mapping results from a sporting event (such as the finishing positions of each horse in a horse race, for example) to various inputs used in a game (such as the cards in a blackjack hand or a roll of each die in a craps game, for example). For a particular game, a number of sets of such mapping rules may be provided, each corresponding to a particular number of participants in a sporting event. Thus, for example, one set of rules may be used to determine a roll of the dice for a craps game based on the finishing positions of horses in an eight-horse race, while a different set of rules may be used to determine a roll of the dice for the craps game based on the finishing positions of horses in a twelve-horse race. Thus, inputs for games may be determined from various sporting events regardless of the number of participants in such sporting events.

Yet another advantage is that an indication of the progress of a sporting event to which a bettor's bet is assigned may be communicated to the bettor via a communication network. In certain embodiments, a video feed of all or portions of the sporting event (such as a horse race, for example) may be communicated to the bettor via the Internet. In some embodiments, the indication of the progress of the sporting event may be communicated to the bettor in real time or substantially in real time. For example, in particular embodiments, a video feed of the sporting event is communicated to the bettor in real time or substantially in real time. Thus, the bettor may witness the sporting event that will be used to determine the result of his bet.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 is a chart illustrating several examples of game inputs for various games in accordance with one embodiment of the present invention;

FIG. 3 illustrates example rules for determining game inputs for a craps game based on results from a horse race according to one embodiment of the invention;

FIG. 4 illustrates example rules for determining inputs for a blackjack game based on results from a horse race and selected finishing positions according to one embodiment of the invention;

FIG. 5 illustrates example rules for determining inputs for card games in general based on results from a horse race according to one embodiment of the invention;

FIGS. 6A-6B illustrate example rules for determining inputs for a slots game based on results from a horse race and selected finishing positions according to one embodiment of the invention.

DETAILED DESCRIPTION OF EXAMPLE EMBODIMENTS OF THE INVENTION

Figure 1:
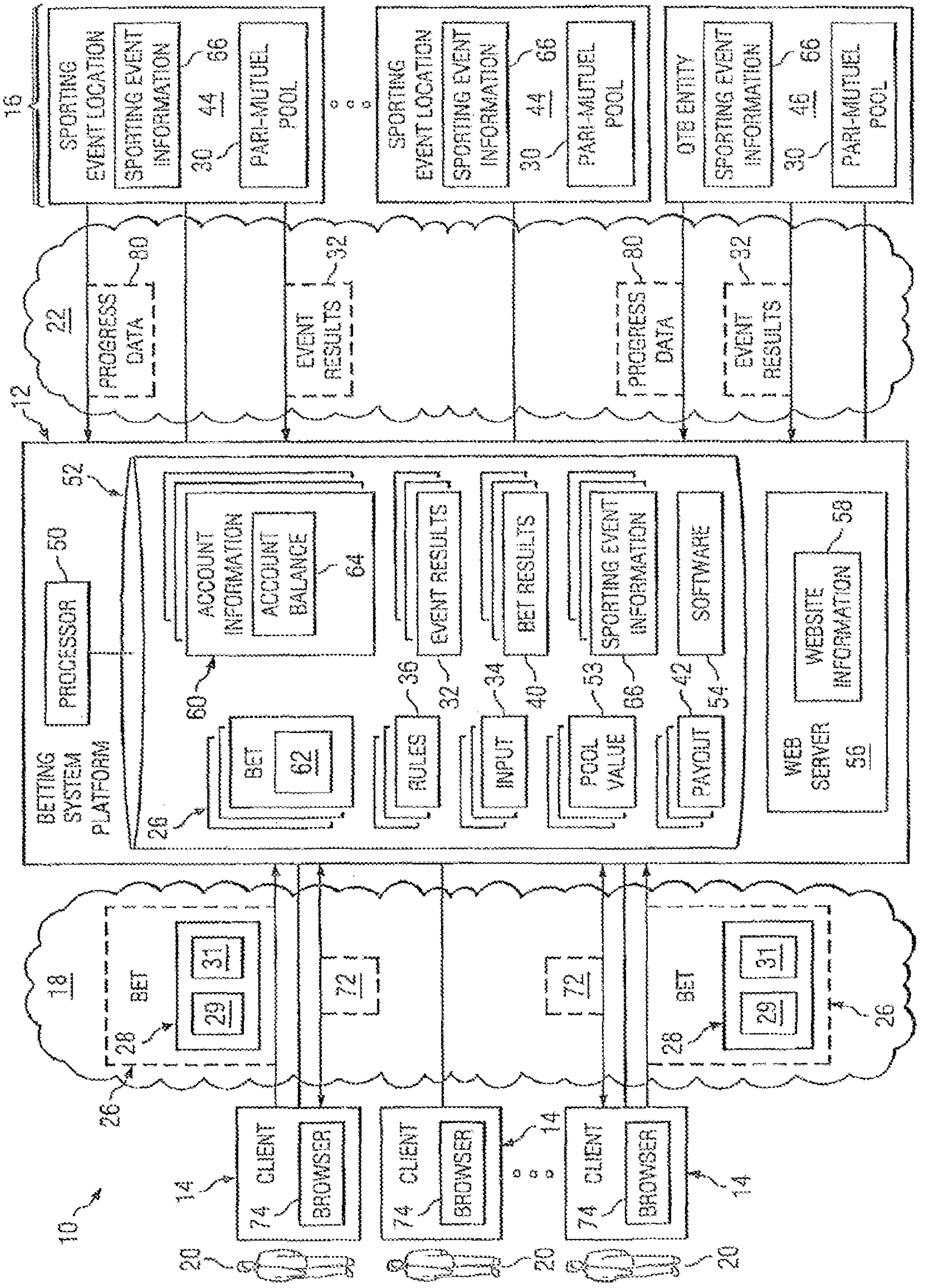
FIG. 1 illustrates an example system for providing pari-mutuel gaming based on results from sporting events in accordance with an embodiment of the present invention.

FIG. 1 illustrates an example system 10 for providing pari-mutuel gaming based on results from a sporting event in accordance with an embodiment of the present invention. In general, system 10 allows users to place bets for which the results of such bets are determined at least in part by the results of sporting events, such as, for example, a horse race, a dog race, an auto race, a jai alai game, a baseball game, a football game, a soccer game, a hockey game, a basketball game, or a cricket match. Users of system 10 may place bets on various games, such as standard casino games. In one embodiment, each bet is assigned to one of a number of sporting events, such as horse races or dog races. Funds associated with each bet are included in a wager pool associated with the sporting event to which that bet is assigned. The outcome of each bet is determined based at least in part on the results of the sporting event to which that bet is assigned, such as the finishing positions of horses participating in a horse race, for example. For each winning bet, a payout is determined in a pari-mutuel manner from the wager pool associated with the sporting event to which that winning bet was assigned.

System 10 includes a betting system platform 12, a plurality of clients 14, and one or more pari-mutuel wager pool hosts 16. Clients 14 may be coupled to betting system platform 12 via a communication network 18 to provide users 20 access to betting system platform 12. Betting system platform 12 may be generally operable to manage bets 26 received from users 20 of clients 14. Pari-mutuel wager pool hosts 16 may be coupled to betting system platform 12 via a communication network 22 and may host one or more pari-mutuel wager pools 30. In some embodiments, betting system platform 12 functions as an Internet betting provider that provides Internet account wagering by providing online betting accounts to clients 14. Using an online betting account, a client 14 may interface with one or more websites associated with betting system platform 12 in order to fund the account, view betting information regarding betting events, and place bets 26. Such online betting accounts may include one or more various types of accounts, such as deposit accounts, credit accounts, stop-loss accounts, and hybrid accounts, for example.

Communication network 18 couples and facilitates wireless or wireline communication between clients 14 and betting system platform 12, while communication network 22 couples and facilitates wireless or wireline communication between pool hosts 16 and betting system platform 12. Each communication network 18 and 22 may include one or more servers, routers, switches, repeaters, backbones, links and/or any other appropriate type of communication devices coupled by links such as wireline, optical, wireless, or other appropriate links. In general, each communication network 18 or 22 may include any interconnection found on any communication network, such as a local area network (LAN), metropolitan area network (MAN), wide area network (WAN), the Internet, portions of the Internet, or any other data exchange system. In certain embodiments, communication networks 18 and 22 may be completely distinct, partially overlapping or integrated, or completely overlapping or integrated.

Pool hosts 16 may include any entity suitable to host a pari-mutuel wager pool 30. For example, in the embodiment shown in FIG. 1, pool hosts 16 include one or more sporting event locations 44, such as one or more horse tracks or dogs tracks, for example, and one or more off track betting (OTB) entities 46, such as one or more OTB parlors or casinos, for example. As shown in FIG. 1, each pool host 16 may maintain one or more pari-mutuel wager pools 30, as well as sporting event information 66 for each sporting event associated with that pool host 16. Each pari-mutuel wager pool 30 is a pool of the funds associated with bets 26 assigned to a particular sporting event that is distributed in an at least partially pari-mutuel manner to users 20 who placed winning bets 26.

Sporting event information 66 includes various information regarding sporting events scheduled to occur at each sporting event location 44 or associated with each OTB entity 46, such as the type of the sporting event, the number of participants (such as the number of horses or dogs, for example) in the event, information regarding each participant in the event (such as the jersey number of each player or the number of each horse or dog, for example), the scheduled time for the start of the event, and an approximate duration of the event, for example. Each pool host 16 may communicate sporting event information 66 to betting system platform 12 at various times. For example, in certain embodiments, each pool host 16 may communicate sporting event information 66 to betting system platform 12 at the beginning of each day and send real-time or substantially real-time updates for such sporting event information 66 to betting system platform 12 throughout the day and night.

In some embodiments, pari-mutuel wager pools 30 are hosted by betting system platform 12 such that the funds associated with bets 26 are not transferred between betting system platform 12 and sporting event locations 44 or OTB entities 46. In other embodiments, pari-mutuel wager pools 30 are hosted by both betting system platform 12 and one or more pool hosts 16 such as one or more sporting event locations 44 or OTB entities 46.

As discussed above, betting system platform 12 may be generally operable to manage bets 26 received from clients 14 via communication network 18. Each bet 26 is defined by one or more bet parameters 28 such as the identity of the user 20 who placed the bet 26, a unit stake 29 of the bet 26, the time the bet was placed, the game associated with the bet, the particular type of bet, and one or more selected finishing positions 31, for example. The unit stake 29 of a bet 26 represents the amount that the user 20 placing the bet wishes to wager on the bet 26. The unit stake 29 may be defined as a monetary value, such as in dollars or pounds for example, as a number of betting credits, or in any other suitable manner.

System 10 may offer bets 26 regarding any number of games that have one or more game inputs 34 that are typically determined based at least in part on luck or by chance. Games offered by system 10 may include casino games (such as craps, blackjack, roulette, slots, keno, baccarat, war, money wheel, poker, pai gow poker, and hold 'em, for example), games that are similar to, or based on, such casino games, and other games having one or more game inputs 34. As discussed above, game inputs 34 include one or more inputs for a game that are typically determined at least in part on luck or by chance. FIG. 2 is a chart illustrating several examples of game inputs 34 for various games offered by system 10 in accordance with one embodiment of the present invention.

One or more types of bets may be available for various games offered to users 20 by betting system platform 12. Some of such types of bets may be similar or identical to types of bets offered by a casino or other betting provider, while other types of bets may not. For example, for a craps game, example types of bets 26 may include a 7 or 11 bet, a field bet, a place bet, or a hardways bet. As another example, for a roulette game, example types of bets 26 may include a bet on black or red, a bet on odd or even, a straight bet (a bet on an individual number), a two-number bet, a three-number bet, a four-number bet, a column bet, and a dozen bet. Thus, in such situations in which more than one type of bet 26 is available for a particular game, parameters 28 for each bet 26 on that game may define the type of that bet 26.

In some embodiments, such as where sporting events include races (such as horses races, dog races or auto races, for example), one or more selected finishing positions 31 are associated with certain bets 26. Each selected finishing position 31 represents a particular finishing position in a race event, such as, for example, the winning position, the 4th place position, or the 9th place position. As discussed in greater detail below, the selected finishing positions 31 associated with a bet 26 are used to determine one or more game inputs 34 for that bet 26 based on the number of the participant in the race event that finishes in each selected finishing position 31. For example, if the selected finishing positions 31 of "2nd" and "4th" are associated with a particular bet 26, and the bet 26 is assigned to a particular horse race, the numbers of the horses finishing "2nd" and "4th" in the particular horse race may be used in determining one or more game inputs 34 for the particular bet 26. In certain embodiments, selected finishing positions 31 are selected automatically for various bets 26 received from users 20. For example, selected finishing positions 31 may be determined randomly for each bet 26. In other embodiments, a user 20 may select, or have the option to select, one or more finishing positions 31 for bets 26 placed by that user 20.

In some embodiments, the one or more finishing positions 31 associated with each bet 26 assigned to a particular sporting event, or for each bet 26 on a particular type of game, are the same. In other embodiments, different bets 26 assigned to a particular sporting event, or different bets 26 on a particular type of game, may have different associated finishing positions 31. For example, if two bettors place bets 26 that are assigned to the same particular horse race, one of the bettors may have selected finishing positions 31 of 1st, 4th and 6th for his bet 26, while the other bettor may have selected finishing positions 31 of 2nd, 3rd and 4th for his bet 26. In this example, suppose that the one or more game inputs 34 for each bet 26 are determined based on the horses that finish in each of the selected finishing positions 31 associated with that bet 26. Thus, the two bets 26 may have different game inputs 34, as well as different bet results 40.

Betting system platform 12 may include a processor 50 coupled to a memory 52 and is generally operable to manage bets 26 received from users 20 of clients 14. Processor 50 is generally operable to execute various algorithms or calculations to determine various data such as game inputs 34, bet results 40, pool values 53 of each pari-mutuel wager pool 30, and payouts 42, for example. Processor 50 may comprise any suitable processor that executes a betting system software application 54 or other computer instructions, such as a central processing unit (CPU) or other microprocessor, and may include any suitable number of processors working together.

Memory 52 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Memory 52 is generally operable to store various information that may be used by processor 50 in determining game inputs 34, bet results 40, pool values 53 of each pari-mutuel wager pool 30, and payouts 42. For example, memory 52 may comprise any suitable number of databases, which may be co-located or physically and/or geographically distributed. In the example shown in FIG. 1, memory 52 may store any or all of the following: account information 60 for users 20; bet information 62 regarding bets 26 received from users 20; sporting event information 66; event results 32; game inputs 34; a set of rules 36 for each game offered by betting system platform 12; bet results 40; payouts 42; and pool values 53 of pari-mutuel wager pools 30 hosted by pool hosts 16.

Account information 60 may include various information regarding one or more accounts maintained for each user 20 of system 10, such as, for example, personal information regarding the user 20, an account ID, a user password, the type of each account maintained for the user 20, and an account balance 64 for each account. In certain embodiments, account information 60 for each user 20 may be managed by betting system platform 12. For example, betting system platform 12 may manage the account balance 64 for each account associated with a user 20, which may include, for example, adding funds received from users 20, moving funds between accounts and pari-mutuel wager pools 30 as appropriate, and allowing users 20 to withdraw funds from their accounts.

Bet information 62 regarding received bets 26 may include the parameters 28 defining each bet 26 received from a user 20, such as the identity of the user 20 who placed the bet 26, the unit stake 29 of the bet 26, the time the bet was received by betting system platform 12, the game associated with the bet, the particular type of bet, and one or more selected finishing positions 31, for example. In addition, bet information 62 regarding each bet 26 may identify other information regarding the bet 26, such as the pari-mutuel wager pool 30 (if any) to which the bet 26 is assigned by betting system platform 12; the status of the bet 26, such as whether the bet 26 is pending, completed or cancelled, and if the bet 26 was completed, the bet result 40 of the bet 26 (for example, whether the bet 26 was determined a win, loss, or push); and the status of the funds associated with the bet 26, for example.

As discussed above, sporting event information 66 includes various information regarding various sporting events. Betting system platform 12 may receive sporting event information 66 from race hosts 16 at various times. For example, as discussed above, in certain embodiments, betting system platform 12 may receive sporting event information 66 from each pool host 16 at the beginning of each day, as well as receive real-time or substantially real-time updates to such sporting event information 66 throughout the day and night. Thus, sporting event information 66 maintained by betting system platform 12 may be kept substantially updated.

Event results 32 may include results from various types of sporting events, such as a horse race, a dog race, an auto race, a jai alai game, a baseball game, a football game, a soccer game, a hockey game, a basketball game, or a cricket match, for example. Event results 32 may include results of completed events or in some embodiments, results of events within the duration of a sporting event. Event results 32 for a horse race, a dog race, or an auto race may include, for example, the finishing position of each participant (such as the finishing position of each horse, dog or automobile, for example) in the race event, the number or other indicia assigned to each participant (such as each horse, dog, or automobile) in the race event, the position of particular participants at a certain point within the race event (such as the leading car at the end of a particular lap in an auto race, for example), the time of the finish of the race event, and the time of the official results for the race event. In certain embodiments, event results 32 for race events are received from a sporting event location 44 and/or OTB entity 46 after the completion of the race event or after the results of the race event have been made official.

Event results 32 for a baseball game may include, for example, whether the next pitch is a ball or a strike, or the outcome of the next at-bat in the game. Event results 32 for a football game may include, for example, the result of the next play from scrimmage (such as the number of yards gained or lost, or the number of the player who carries the ball or makes a tackle, for example), the score at the end of a quarter, or the score at the end of the game. Event results 32 for a jai alai game may include, for example, points scored by particular players. Event results 32 for a soccer game may include, for example, the number of the player who scores the next goal, takes the next shot or commits the next foul, or the time of the next goal scored, the next foul, or the next corner kick. Event results 32 for a hockey game may include, for example, the number of the player who scores the next goal, takes the next shot or commits the next penalty, or the time of the next goal scored, the next penalty, or the next whistle. Event results 32 for a basketball game may include, for example, the score at the end of the game, the score at a particular point in the game (such as at the end of a quarter or half), the number of the player who scores the next basket, or the number of points scored in a particular period of time. Event results 32 for a cricket match may include, for example, the number of runs or innings.

As discussed above, game inputs 34 include one or more inputs for a game that are typically determined at least in part on luck or by chance, and FIG. 2 illustrates a table 90 defining example game inputs 34 for various games in accordance with one embodiment of the present invention. Table 90 includes a first column 92, a second column 94 and a number of rows 96. First column 92 indicates various games, while second column 94 indicates one or more game inputs 34 for each game listed in column 92. Each row 96 associates a particular game with one or more one or more game inputs 34 for that game. For example, row **96*a* indicates that example game inputs 34** for a roulette game may be (1) the numerical result of a simulated roulette spin—a single number from 1 to 36, or 0 or 00; or (2) the color of the result of a simulated roulette spin—either black, red or green.

Rules 36 for Determining Inputs 34 for Games and Bet Results 40 for Bets 26

The one or more set of rules 36 for each game offered by betting system platform 12 may include any rules suitable to define that game. The rules 36 for each game may be identical, similar, or different from the rules used to define such game by a particular betting services provider, such as a casino or online gambling service, for example. In addition, the rules 36 for each game define how to determine game inputs 34 from event results 32 and/or parameters 28 of bets 26, such as selected finishing positions 31, for example.

FIGS. 3-6 illustrate several example sets of rules 36 for various games that define how to determine game inputs 34 for such games based on (1) event results 32 from horse races and, in some cases, (2) selected finishing positions 31 for each bet 26. Multiple sets of rules 36 are provided for each game such that each set of rules 36 for a particular game corresponds to one or more particular numbers of horses in the relevant horse race. In some embodiments, a different set of rules 36 may be provided for each anticipated number of horses in a horse race that may be used for determining game inputs 34. It should be noted that although FIGS. 3-6 illustrate a first set of rules 36 for a horse race having 8 horses and a second set of rules 36 for a horse race having 12 horses, additional sets of rules 36 may be provided for each game for horse races having other numbers (i.e., other than 8 or 12) of participating horses.

FIG. 3 illustrates example sets of rules 36 for determining inputs 34 for a craps game based on received event results 32 from horse races having either 8 or 12 horses according to one embodiment of the invention. FIG. 4 illustrates example rules 36 for determining inputs 34 for a blackjack game based on (1) received event results 32 from horse races having either 8 or 12 horses and (2) selected finishing positions 31 according to one embodiment of the invention. FIG. 5 illustrates example rules 36 for determining inputs 34 for card games in general based on received event results 32 from horse races having either 8 or 12 horses according to one embodiment of the invention. FIGS. 6A-6B illustrate example rules 36 for determining inputs 34 for a slots game based on (1) received event results 32 from horse races having either 8 or 12 horses and (2) selected finishing positions 31 according to one embodiment of the invention. It should be understood that rules 36 shown in FIGS. 3-6 are merely examples. Rules 36 may be similarly provided for determining game inputs 34 for other types of games, as well as for determining game inputs 34 from event results 32 of other types of sporting events, such a horse race, a dog race, an auto race, a jai alai game, a baseball game, a football game, a soccer game, a hockey game, a basketball game, or a cricket match, for example.

Rules 36 may also define how to determine a bet result 40 for each bet 26 based on game inputs 34 determined from event results 32 and/or parameters 28 of bets 26, such as the type of each bet 26. For example, rules 36 for a blackjack game may define that (1) if the total value of the cards determined as inputs 34 for that bet 26 is between 18 and 21 (including 18 and 21), the bet 26 is a "win"; (2) if the total value of the cards determined as inputs 34 is less than 17 or greater than 21, the bet 26 is a "loss"; and (3) if the total value of the cards determined as inputs 34 is equal to 17, the bet 26 is a "push."

In some embodiments, rules 36 may also define how to determine payouts 42 for winning bets 26. Rules 36 for certain games may define that payouts 42 per unit stake 29 for winning bets 26 on a particular game may be based on (1) the type of each winning bet 26 and/or (2) the one or more inputs 34 determined for each winning bet 26. Thus, rules 36 may prescribe different payouts 42 for two winning bets 26 having the same unit stake 29 if (1) the bets 26 were different types of bets 26, as indicated by parameters 28 of each bet 26 and/or (2) one or more different inputs 34 were determined for each bet 26. For example, suppose a slots game in which the inputs 34 (the spin of each of three reels) are determined from event results 32 using the example rules 36 shown in FIGS. 6A-6B above. Rules 36 may also define various payouts for different combinations of inputs 34 for winning bets 26. For example, suppose that rules 36 define that a bet 26 is a winning bet if the three inputs 34 are either (1) three cherries, (2) three lemons, (3) three oranges or (4) three bars, and all bets having any other combination of inputs 34 are losing bets. Rules 36 may further define, for example, that the payout 42 for winning bets 26 having three cherries as inputs 34 will be three times the payout 42 for winning bets 26 having three lemons, three oranges, or three bars as inputs 34. Thus, in this example, the payout 42 for a $10 bet 26 for which three cherries are determined as inputs 34 will be twice the amount of a $10 bet 26 for which three oranges are determined as inputs 34. Other variations of rules 36 may be implemented in other examples to achieve different results.

Bet results 40 include results of each bet 26, which may be determined by betting system platform 12 based at least on the set of rules 36 for the particular game and one or more game inputs 34 determined for that bet 26. In certain embodiments, bet results 40 may comprise one or more of the following: "win," "loss," "push," or "no action."

Determining Pari-Mutuel Payouts 42 for Winning Bets 26

Pool values 53 of each pari-mutuel wager pool 30 represent the current value of funds within each pari-mutuel wager pool 30. Betting system platform 12 may communicate with each pool host 16 in order to maintain pool values 53 current for each pari-mutuel wager pool 30. In certain embodiments, betting system platform 12 may use pool values 53 for determining other data, such as payouts 42 for winning bets 26, for example.

Payouts 42 may be determined in a pari-mutuel manner by betting system platform 12 for each winning bet 26. For example, payouts 42 for each winning bet 26 for a particular sporting event are determined based on the unit stake 29 associated with that bet 26, the total of the unit stakes 29 associated with all winning bets 26, the value of the pari-mutuel wager pool 30 associated with the particular sporting event and/or rules 36 regarding the game that are relevant to determining payouts 42 for winning bets 26. As discussed above, betting system platform 12 may use a pool value 53 corresponding with the pari-mutuel wager pool 30 for determining payouts 42. In certain embodiments, one or more values may by subtracted from the value of the pari-mutuel wager pool 30 before payouts 42 are determined for winning bets 26. For example, the unit stakes 29 of "push" bets 26 and/or "no action" bets 26 may be subtracted from the value of the pari-mutuel wager pool 30 before payouts 42 are determined. In addition, a take-out may be subtracted from the pari-mutuel wager pool 30 before payouts 42 are determined. In certain embodiments, the take-out is a predetermined percentage of the pari-mutuel wager pool 30. In a particular embodiment, the take-out is 10% of the pari-mutuel wager pool 30. The take-out for a pari-mutuel wager pool 30 may be associated with the pool host that hosts that pari-mutuel wager pool 30. For example, a sporting event location 44 that hosts a pari-mutuel wager pool 30 for a horse race occurring at that sporting event location 44 may subtract and keep at least a portion of a take-out from the pari-mutuel wager pool 30. In certain embodiments, the take-out may be distributed between a pool host 16 and betting system platform 12 according to some predetermined arrangement.

Thus, in certain embodiments, the payout for winning bets 26 for a particular sporting event may be calculated as follows. First, "push" bets 26 and/or "no action" bets 26 are subtracted from the pool value 53 corresponding to the pari-mutuel wager pool 30 for the particular sporting event. Next, a take-out, which is a predetermined percentage of the remaining pool value 53, is subtracted from the remaining pool value 53. The remaining pool value 53 may then be divided among all winning bets 26, in proportion to the unit stake 29 of each winning bet 26.

For example, suppose that the unit stakes 29 of winning bets 26 placed by Client A and Client B for a particular horse race are $50 and $100, respectively. Further suppose that the pool value 53 corresponding to the pari-mutuel wager pool 30 for the particular horse race is $5,000, the total unit stake 29 of all "push" bets 26 is $2,000, the total unit stake 29 of all winning bets 26 is $1,000, and the take-out is 10%. To determine the payout 42 for Clients A and B, first the $2,000 for the "push" bets 26 is subtracted from the $5,000 pool value, leaving a pool value of $3,000. Next the 10% take-out ($300) is removed, leaving a pool value of $2,700. The remaining $2,700 is then divided among all winning bets 26 in proportion to the unit stake 29 of each winning bet 26. Since the unit stake 29 of Client B's winning bet 26 ($100) accounts for 1/10 of the total unit stake 29 of all winning bets 26 ($1,000), the payout 42 for Client B's bet 26 will be (1/10)*($2,700)=$270. Similarly, since the unit stake 29 of Client A's winning bet 26 ($50) accounts for 1/20 of the total unit stake 29 of all winning bets 26 ($1,000), the payout 42 for Client A's bet 26 will be (1/20)*($2,700)=$135.

In certain embodiments, betting system platform 12 may be associated with or comprise one or more web servers 56 operable to store websites and/or website information 58 in order to host one or more web pages 72. Web servers 56 may be coupled to communication networks 18 or 22 and may be partially or completely integrated with, or distinct from, betting system platform 12. Each client 14 may include a browser application 74 operable to provide an interface to web pages 72 hosted by web servers 56 such that users 20 may communicate information to, and receive information from, betting system platform 12 via communication network 18. For example, one or more web pages 72 may allow a user 20 to select various parameters for a bet 26, such as the type of game, the type of the bet 26, the unit stake 29 for the bet 26 and/or one or more selected finishing positions 31, for example, and to submit the bet 26 having such selected parameters.

One or more web pages 72 may be operable to communicate various information to the user 20, such as, for example, various account information 60, information regarding available bets 26 that may be placed by user 20 (such as the current pari-mutuel wager pool 30 for a particular sporting event or the amount wagered by all users 20 on particular types of bets 26, for example), information regarding the status of bets 26 placed by the user 20 (such as the sporting event to which each bet 26 is assigned, and the current pari-mutuel wager pool 30 for that sporting event, and the amount wagered by all users 20 on particular types of bets 26 for that sporting event, for example).

Assigning Bets 26 to Sporting Events and/or Pari-Mutuel Wager Pools 30

As discussed above, betting system platform 12 manages the assignment of each received bet 26 to a particular sporting event and submits the funds associated with that bet 26 to a pari-mutuel wager pool 30 corresponding to that sporting event. The management of this assignment of bets 26 to pari-mutuel wager pools 30 may be done in any suitable manner. In certain embodiments, betting system platform 12 may determine the particular sporting event (and corresponding pari-mutuel wager pool 30) to which to assign each bet 26 based on various sporting event information 66 regarding sporting events scheduled to occur around the time that the bet 26 was received by betting system platform 12. Such sporting event information 66 for a particular sporting event may include, for example, the type of the sporting event, the number of participants in the sporting event, information regarding the participants in the sporting event, the scheduled time of the sporting event, and an approximate duration of the sporting event. In some embodiments, betting system platform 12 may execute one or more suitable algorithms to manage the assignment of bets 26 to pari-mutuel wager pools 30 based on such sporting event information 66 and/or various other information.

Betting system platform 12 may also take into account one or more bet parameters 28 associated with each bet 26 in determining the sporting event and/or pari-mutuel wager pool 30 to which to assign each bet 26. For example, in some embodiments, only bets 26 on a particular game (for example, craps, blackjack or roulette), or particular types of bets on a particular game (for example, bets on red or black, but not bets on individual numbers, in a roulette game), are assigned to a particular sporting event. In other embodiments, more than one pari-mutuel wager pool 30 may correspond with each sporting event. For example, for a particular sporting event, different pari-mutuel wager pools 30 may be used for bets 26 on different games (for example, separate pools 30 for bets 26 on craps, bets 26 on blackjack, and bets 26 on roulette), or for particular types of bets on a particular game (for example, a first pool 30 for bets 26 on red/black in a roulette game and a second pool 30 for bets 26 on individual numbers in a roulette game). In such embodiments, betting system platform 12 may determine for each bet 26 both (1) the sporting event to which to assign the bet 26, and (2) the appropriate one of the one or more pari-mutuel wager pools 30 corresponding to that sporting event, based on the bet parameters 28 of the bet 26. In other embodiments, a pari-mutuel wager pool 30 is provided for each sporting event and is used for all bets 26 assigned to that sporting event, regardless of the game (for example, craps, blackjack or roulette) or the type of each bet 26.

In some embodiments, betting system platform 12 determines (or attempts to determine) which sporting event will be the next in time—such as the next race to begin, the next race for which the betting will be closed, the next race to finish, or the next race for which official results will be posted, for example—and assigns particular received bets 26 to that sporting event. In other embodiments, betting system platform 12 assigns particular bets 26 to the sporting event that is (a) determined to be next in time and (b) that meets one or more other criteria for the bet 26. For example, suppose that according to the set of rules 36 for blackjack games, game inputs 34 (card values) can only be determined from event results 32 of a race (such as a horse race, a dog race or an auto race, for example) having at least 8 race participants. In such instance, betting system platform 12 assigns each received bet 26 for a blackjack game to the next race that has at least 8 participants.

Communicating Progress Data 80 Regarding Sporting Events to Users 20

In some embodiments, betting system platform 12 may also receive progress data 80 from one or more sporting event locations 44 and/or OTB entities 46 via communication network 22 regarding the progress of particular sporting events. Progress data 80 may include for example, an indication of the respective positions of each participant in a sporting event as the sporting event progresses. In certain embodiments, progress data 80 includes a video of a sporting event, and in a particular embodiment, progress data 80 includes a live (or substantially live) video feed of a sporting event.

Betting system platform 12 may communicate such progress data 80 to users 20 via communication network 18. In certain embodiments, betting system platform 12 may communicate such progress data 80 to users 20 via one or more web pages 72 that may be viewed using browser application 74. For example, betting system platform 12 may communicate to a user 20 one or more web pages 72 indicating progress data 80 regarding a sporting event to which a bet 26 placed by that user 20 has been assigned such that the user 20 may track the progress of the sporting event. In certain embodiments in which progress data 80 includes a video of a sporting event, betting system platform 12 may communicate such video to a client 14 via communication network 18. In a particular embodiment, betting system platform 12 may communicate a live (or substantially live) video feed of the sporting event to client 14 via communication network 18. In various embodiments, betting system platform 12 may communicate progress data 80 to users 20 in real-time, substantially in real-time, or with some delay.

General Operation of System 10

As discussed above, in operation, betting system platform 12 may allow users 20 to place bets 26 in which the results of the bets 26 are determined at least in part by the results of sporting events, such as a horse race, a dog race, an auto race, a jai alai game, a baseball game, a football game, a soccer game, a hockey game, a basketball game, or a cricket match, for example. Each bet 26 is defined by one or more bet parameters 28 such as the identity of the user 20 who placed the bet 26, the unit stake 29 of the bet 26, the time of the bet, the game associated with the bet, the particular type of bet, and in some instances, one or more selected finishing positions 31, for example. Bets 26 received by betting system platform 12 from various users 20 within a particular time period are assigned to a particular sporting event and the unit stake 29 of the bet 26 is included in a pari-mutuel wager pool 30 corresponding to the particular sporting event.

After the sporting event is completed, event results 32 of the sporting event may be received by betting system platform 12. For example, if the sporting event is a horse race, event results 32 may include the number of the horse finishing in each position in the race. Betting system platform 12 may then determine for each bet 26 one or more game inputs 34 for the game. In situations or embodiments in which game inputs 34 are the same for each bet 26, betting system platform 12 may determine the one or more game inputs 34 based at least on (1) the received event results 32; and (2) relevant rules 36 regarding the game. For example, assuming the sporting event is a horse race, in an embodiment in which betting system platform 12 uses the rules 36 for craps shown in FIG. 3, betting system platform 12 may determine as game inputs 34 for a craps game a first simulated die roll and a second simulated die roll based on (1) the received results 32 of the horse race and (2) the rules 36 shown in FIG. 3. In using the rules 36 shown in FIG. 3, betting system platform 12 may select the appropriate set of rules corresponding to the number of participants in the race. The determined first simulated die roll and a second simulated die roll are used for each bet 26.

Alternatively, in situations or embodiments in which different game inputs 34 are used for different bets 26, betting system platform 12 may determine the one or more game inputs 34 for each bet 26 based at least on (1) the received event results 32; (2) relevant rules 36 regarding the game; and, in some instances, (3) one or more bet parameters 28 of that bet 26. For example, again assuming the sporting event is a horse race, suppose an embodiment in which each bet 26 for a slots game has three finishing positions 31 randomly assigned to that bet 26. Betting system platform 12 may determine as game inputs 34 for each slots bet 26 the results of a simulated spin of a first slot machine reel, a second slot machine reel, and a third slot machine reel based on (1) the received results 32 of the horse race; (2) the rules 36 shown in FIGS. 6A-6B; and (3) the three finishing positions 31 assigned to that bet. In particular, for each bet 26, betting system platform 12 may use rules 36 to map the numbers of the horse that finish in the three finishing positions 31 to the results of simulated spins of a first, second, and third slot machine reel, which results are used as game inputs 34 for that bet 26. Since different finishing positions 31 may be assigned to different bets 26, the results of the simulated spins of the first, second, and third slot machine reels may be different for different bets 26.

After determining the game input(s) 34 for each bet 26, betting system platform 12 may then determine a bet result 40 of the game for each bet 26 assigned to the particular race based at least on (1) relevant rules 36 regarding the game; (2) the determined game input(s) 34; and, in some instances, (3) one or more parameters 28 of that bet 26. In some embodiments, betting system platform 12 may determine a bet result 40 of "win," "loss," or in some cases, "push," for each bet 26. For example, in the craps example discussed above, the parameters 28 associated with each bet 26 may define the type of the bet, such as a "7 or 11" bet, a "field" bet, or a "place" bet on a particular number, for example. A "7 or 11" bet 26 is determined a "win" if the total value of the two simulated dice rolls equals 7 or 11. A "field" bet 26 is determined a "win" if the total value of the two simulated dice rolls equals 2, 3, 4, 9, 10, 11, or 12. A "place" bet 26 is determined a "win" if the total value of the two simulated dice rolls equals a number selected by the user who placed the bet 26 (which selected number may be stored as a bet parameter 28 for that bet 26).

After determining the bet result 40 for each bet 26, betting system platform 12 may then determine how to distribute the pari-mutuel wager pool 30, or at least a portion of the pari-mutuel wager pool 30, in a pari-mutuel manner. For example, betting system platform 12 may determine a distribution of at least a portion of the pari-mutuel wager pool 30 among all winning bets 26, including determining a payout 42 for each winning bet 26 based at least on (1) the portion of the pari-mutuel wager pool 30 to be distributed among winning bets 26; (2) the total of the unit stakes of all winning bets 26; (3) the unit stake of that winning bet 26; and, in some situations, (4) payout odds based on the type of that bet 26. In some situations, one or more bets 26 may be determined to be "pushes." For example, in a particular embodiment, a blackjack bet 26 in which the cards (i.e., game inputs 34) determined for the user total 17 is determined a "push." In certain embodiments, the unit stake of all bets 26 determined to be "pushes," if any, may be withheld in the pari-mutuel wager pool 30 (i.e., not distributed) and carried over to a subsequent race or other sporting event.

EXAMPLE MANAGEMENT OF CRAPS BETS

As a more particular example of the operation of system 10, suppose the game is craps, the particular sporting event is a particular horse race having eight horses, and the game inputs 34 for the craps game are two die rolls determined according to the rules 36 shown in FIG. 3. Further suppose that according to the rules 36 for the craps game, the types of bets 26 available to users 20 may include the following:

(1) a "pass line bet"—the user 20 wins if the total of the two dice equals 7 or 11; the user 20 loses if the total of the two dice equals 2, 3 or 12; and the user 20 pushes if the total of the two dice will equals any other number;

(2) a "field bet"—the user 20 wins if the total of the two dice equals 3, 4, 9, 10, or 11; the user 20 wins enhanced odds if the total of the two dice equals 2 or 12; and the user 20 loses if the total of the two dice equals 5, 6, 7 or 8; and (3) a "place bet"—the user 20 selects a number from 2-12 and wins enhanced odds if the total of the two dice equals the selected number; the user 20 loses if the total of the two dice equals any other number.

Further suppose that a number of bets 26 are received from various users 20 and assigned to the particular horse race. The bets assigned to the particular horse race include first bet 26 defined by bet parameters 28 as a "pass line bet," a second bet 26 defined by bet parameters 28 as a "field bet," and a third bet 26 defined by bet parameters 28 as a "place bet on the number 4." Further suppose that the horse race is run and the horses finish in the following order: horse #2 (win), horse #8 (place), horse #7 (show), horse #4, horse #1, horse #3, horse #5, horse #6.

Betting system platform 12 first determines the appropriate set of rules 36 based on the number of horses in the race. Thus, betting system platform 12 selects from the rules 36 shown in FIG. 3 the set of rules 36 corresponding to a horse race having eight horses. Betting system platform 12 then determines the game inputs 34 for the craps game—namely, the first and second simulated die rolls. According to the rules 36 shown in FIG. 3 for an eight-horse race, since the winning horse is horse #2, the first simulated die roll is a 2. Further, since the 2nd place horse is horse #8, betting system platform 12 looks at the 3rd place horse to determine the second simulated die roll. Since the 3rd place horse is horse #7, the second simulated die roll is the same as the first simulated die roll—namely, a die roll of 2. Thus, the total of the first and second simulated die rolls equals 4.

Betting system platform 12 then determines a bet result 40 of the craps game for each bet 26 assigned to the particular horse race. The first bet 26 (the "pass line bet") is determined a "push" based on the rules discussed above for a "pass line bet" and a total two-dice roll of 4. Thus, the unit stake 29 for the first bet 26 (along with the unit stake 29 for all other bets 26 determined to be "pushes") is assigned to a carry-over pool. The carry-over pool is withheld in the pari-mutuel wager pool 30 (i.e., not distributed) and carried over to a subsequent race or other sporting event. After the unit stakes 29 for all "push" bets 26 are assigned to the carry-over pool, a take-out may be determined and withdrawn from the remaining value of pari-mutuel wager pool 30. For example, in one embodiment, 10% of the remaining value of the pari-mutuel wager pool 30 may be removed as a take-out.

The second bet 26 (the "field bet") is determined a "win" based on the rules discussed above for a "field bet" and a total two-dice roll of 4. The third bet 26 (the "place bet on the number 4") is also determined a "win" since the total of the dice roll is 4. Payouts 42 from the remaining portion of the pari-mutuel wager pool 30 (i.e., the portion remaining after the take-out and the unit stakes of all "pushes" are subtracted) are then be determined for each winning bet 26, including the second bet 26 and third bet 26, in a pari-mutuel manner. The payout 42 for the winning second bet 26 may be determined by dividing the unit stake 29 of the second bet 26 by the total of the unit stakes 29 of all winning bets 26, and multiplying the quotient by the remaining portion of the pari-mutuel wager pool 30. The payout 42 for the winning third bet 26 may be determined by dividing the unit stake 29 of the third bet 26 by the total of the unit stakes 29 of all winning bets 26, multiplying the quotient by the remaining portion of the pari-mutuel wager pool 30, and doubling the resulting product. The payout 42 for the winning third bet 26 is doubled since the rules 36 discussed above indicate that the user 20 wins enhanced odds for winning "place bets."

Figure 7:
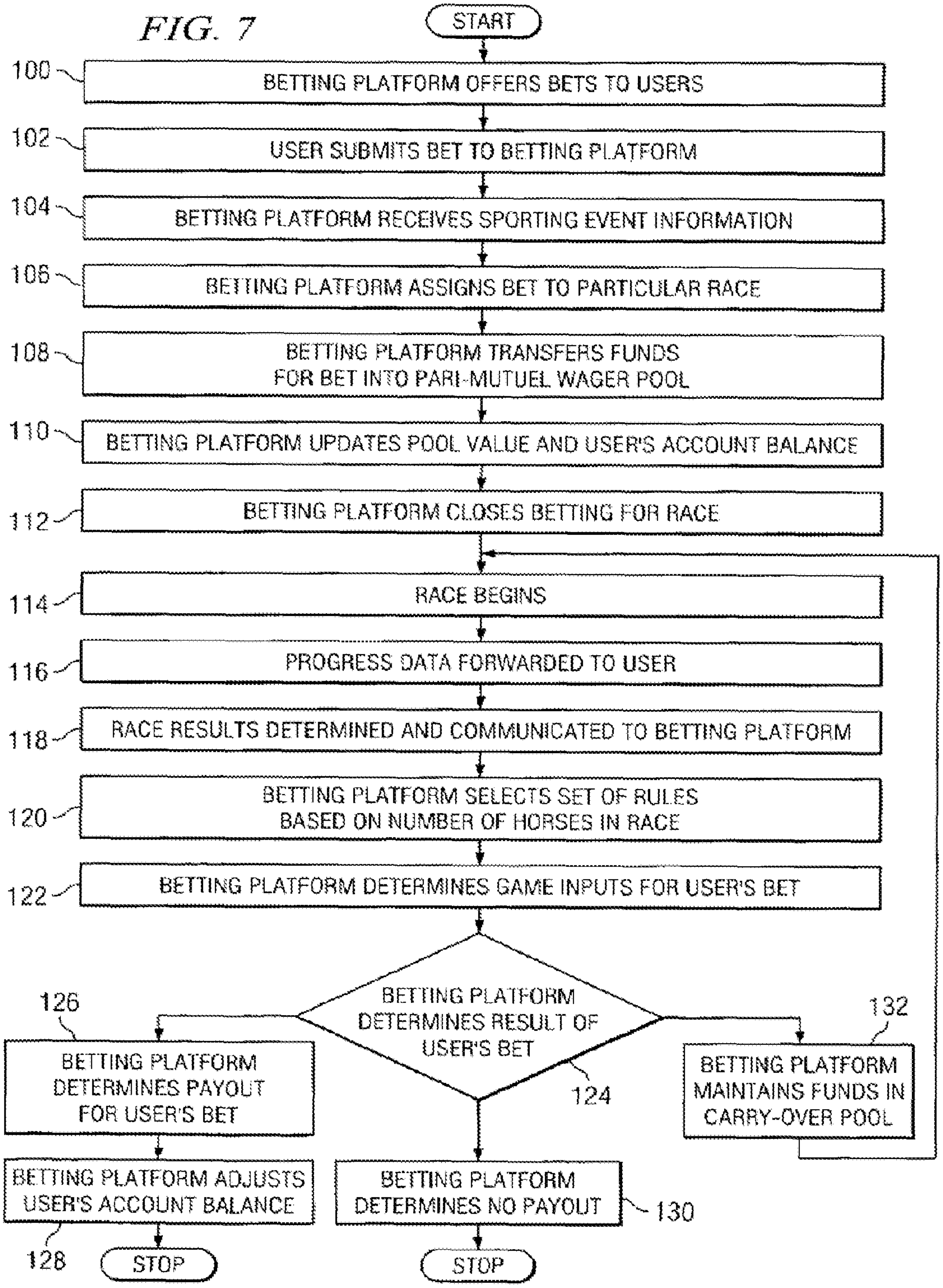
FIG. 7 illustrates an example method of providing pari-mutuel gaming based on results from a sporting event in accordance with the system of FIG. 1.

FIG. 7 illustrates an example method of providing casino game betting based on pari-mutuel racing in accordance with the system of FIG. 1. At step 100, web pages 72 providing various betting information and offering one or more types of bets 26 for various games are communicated from betting system platform 12 to clients 14 and displayed by browser applications 74. At step 102, a user 20A of system 10 interacts with one or more web pages 72 to define and submit a bet 26A to betting system platform 12. Bet 26A is at least partially defined by a number of parameters 28 selected by user 20A. The parameters 28 for bet 26A include the identity of user 20A, the unit stake 29, the time that the bet was submitted, the particular game (such as craps, blackjack, slots or roulette, for example), the particular type of bet, and for certain games, one or more selected finishing positions 31.

At step 104, betting system platform 12 receives sporting event information 66 for various horse races and dog races from one or more sporting event locations 44 and/or OTB entities 46. The sporting event information 66 for each race includes at least the type of the race, the number of participants in the race, the number assigned to each participant in the race, the scheduled time for the start of the race, and an approximate duration of the race.

At step 106, betting system platform 12 executes a set of algorithms to determine how to assign bet 26A to a particular race based on various sporting event information 66 received at step 104, including the number of horses or dogs participating in each race and the scheduled time for the start of the each race. In this embodiment, betting system platform 12 assigns bet 26A to the race that is (a) determined to be next in time and (b) that has a sufficient number of participants for the type of bet 26A. At step 108, betting system platform 12 transfers funds in the amount of the selected unit stake 29 for bet 26A into a pari-mutuel wager pool 30 corresponding with a particular horse race to which bet 26A was assigned. At step 110, betting system platform 12 adds the unit stake 29 of bet 26A to the pool value 53 corresponding with the pari-mutuel wager pool 30, and subtracts the unit stake 29 of bet 26A from an account balance 64 maintained for user 20A. As discussed above, in some embodiments, betting system platform 12 may also take into account one or more bet parameters 28 associated with bet 26A in determining the race and/or pari-mutuel wager pool 30 to which to assign bet 26A. For example, in some embodiments, betting system platform 12 may assign bet 26A to a particular pari-mutuel wager pool 30 that corresponds to the particular game (for example, craps, blackjack or roulette) of bet 26A and/or the type of bets on that particular game (for example, a bet on red or black in a roulette game).

At step 112, betting system platform 12 closes the betting for the particular horse race, thus assigning no more bets 26 to the particular horse race. At step 114, the particular horse race begins. At step 116, progress data 80 indicating the progress of the particular horse race is communicated from the sporting event location 44 hosting the particular horse race to betting system platform 12 and to client 14 being used by user 20A such that user 20A can track the progress of the particular horse race in real-time or substantially in real-time. As discussed above, progress data 80 may include a live or substantially live streaming video feed of the particular horse race.

At step 118, after the completion of the particular horse race, event results 32 are determined at sporting event location 44 and communicated to betting system platform 12. Event results 32 include the assigned number and finishing position of each horse in the particular horse race. At step 120, betting system platform 12 selects a set of rules 36 from a plurality of sets of rules 36 associated with the particular game (such as craps, blackjack, slots or roulette, for example) for which bet 26A regards. In certain embodiments, betting system platform 12 maintains, for each type of game, different sets of rules 36 for different numbers of race participants and at step 120, selects the set of rules 36 corresponding to the number of horses in the particular horse race to which bet 26A was assigned.

At step 122, betting system platform 12 uses the set of rules 36 selected at step 120 to determine one or more game inputs 34 for bet 26A based on event results 32 and/or parameters 28 of bet 26A, such as finishing positions 31 selected by user 20A at step 102. Game inputs 34 for each other bet 26 assigned to the particular horse race are also determined. At step 124, betting system platform 12 uses the set of rules 36 selected at step 120 to determine the bet result 40 of bet 26A, as well as the bet results 40 of each other bet 26 assigned to the particular horse race. In this embodiment, the bet result 40 for bet 26A is either "win," "lose," or "push."

If bet 26A is determined a "win" at step 124, a payout 42 is determined for bet 26A, as well as for each other winning bet 26 assigned to the particular horse race, by betting system platform 12 at step 126. The payout 42 for bet 26A is determined based on the unit stake 29 of bet 26A, the total of the unit stakes 29 of all winning bets 26 (including bet 26A) assigned to the particular horse race, the value of the pari-mutuel wager pool 30 and/or rules 36 that are relevant to determining payouts 42 for winning bets 26. As discussed above, the payouts 42 for each winning bet 26, including bet 26A, may be determined in a pari-mutuel manner after removing (1) the total unit stake 29 for all "push" bets 26 that were assigned to the particular horse race and (2) a take-out. At step 128, the payout 42 determined for bet 26A is added to the account balance 64 associated with user 20A.

If bet 26A is determined a "loss" at step 124, no payout 42 is determined for bet 26A at step 130. If bet 26A is a determined a "push" or "no action" at step 124, no payout 42 is determined for bet 26A at step 132, but the funds for bet 26A (in the amount of the unit stake 29) are entered into a carry-over pool (along with the funds for each other "push" bet 26). The funds in the carry-over pool are maintained within pari-mutuel wager pool 30 and the method returns to step 114 such that bet 26A (along with each other "push" bet 26) is kept alive for the next race or other sporting event. In other embodiments, the funds in the carry-over pool are removed from pari-mutuel wager pool 30 and the method returns to step 106 to reassign the funds in the carry-over pool to one or more other pari-mutuel wager pools 30, as appropriate. Thus, user 20A does not need to wait until the next horse race hosted by the same sporting event location 44 that hosted the particular horse race.

It should be understood that in alternative embodiments, the present invention contemplates using methods with additional steps, fewer steps, different steps, or steps in different sequential order so long as the steps remain appropriate for providing and managing casino game betting based on pari-mutuel racing.

Although embodiments of the invention and their advantages are described in detail, a person skilled in the art could make various alterations, additions, and omissions without departing from the spirit and scope of the present invention as defined by the appended claims.

What is claimed is:

1. A method, comprising the steps of:

receiving from a user a bet on a roulette game;

receiving at least one event result of a sporting event that comprises a total number of participants;

a computing apparatus selecting from a memory device a set of rules, from a plurality of sets of rules, based at least in part on the total number of participants in the sporting event;

wherein the plurality of sets of rules are used for determining, based on event results of sporting events, outcomes that represent simulated roulette spins, the outcomes comprising at least one of:

numerical values, and colors, wherein at least a first set of rules of the plurality of sets of rules are used for determining outcomes based on sporting events that have a first total number of participants;

wherein at least a second set of rules of the plurality of sets of rules are used for determining outcomes based on sporting events that have a second total number of participants, and wherein the first total number of participants is different from the second total number of participants;

the computing apparatus using the selected set of rules to determine, based at least in part on the at least one event result, at least one outcome that represents a simulated roulette spin; and determining a result of the bet on the roulette game based at least in part on the at least one outcome.

2. The method of claim 1, wherein the sporting event comprises at least one of:

a race event, a horse race, a dog race, an automobile race, a baseball game, a basketball game, a football game, a soccer game, a hockey game, a jai alia game, and a cricket match.

3. The method of claim 1, wherein the sporting event comprises a race event having the total number of participants, each participant comprising a numerical identifier; and wherein the at least one event result comprises the numerical identifier of the participant that is in first place at a certain point during the race event.

4. The method of claim 1, wherein selecting the set of rules comprises selecting the set of rules after receiving the one or more event results.

5. The method of claim 1, wherein the sporting event is one of a plurality of sporting events; and wherein the method further comprises the steps of:

the computing apparatus determining the one sporting event from the plurality of sporting events; and in response to receiving the bet from the user, the computing apparatus assigning the bet to the one sporting event such that the result of the bet is based at least in part on the event results of the one sporting event.

6. The method of claim 5, wherein each of the plurality of sporting events has a respective scheduled start time; and wherein determining the one sporting event and assigning the bet comprises:

determining that the scheduled start time of the one sporting event as compared to the plurality of sporting events is next in time relative to a time that the bet is placed; and assigning the bet to the one sporting event based at least in part on determining that the scheduled start time of the one sporting event as compared to the plurality of sporting events is next in time relative to the time that the bet is placed.

7. The method of claim 5, wherein determining the one sporting event comprises determining the one sporting event from the plurality of sporting events based at least in part on at least one of:

a type of the one sporting event,
the total number of participants in the one sporting event,
a completion time of the one sporting event,
an approximate duration of the one sporting event, and
when official results of the one sporting event are posted.

8. The method of claim 5,
wherein each of the plurality of sporting events has a respective total number of participants; and
wherein determining the one sporting event and assigning the bet comprises:
determining, from among the plurality of sporting events, that the total number of participants of the one sporting event is of at least a predetermined amount; and
assigning the bet to the one sporting event based at least in part on determining that the total number of participants of the one sporting event is of at least the predetermined amount.

9. The method of claim 5,
wherein each of the plurality of sporting events has a respective scheduled start time and a respective total number of participants; and
wherein determining the one sporting event and assigning the bet comprises:
determining, from among the plurality of sporting events, that the one sporting event, relative to a time that the bet is placed, is a next sporting event scheduled to start that has a respective total number of participants of at least a predetermined amount; and
assigning the bet to the one sporting event based at least in part on the determination.

10. The method of claim 5, further comprising the step of displaying to the user via a client device an indication that the user's bet is assigned to the determined sporting event.

11. The method of claim 1, wherein:
the sporting event comprises a race event having the total number of participants and a plurality of finishing positions;
each of the participants in the race event comprises a numerical identifier; and
the at least one event result comprises:
(a) the numerical identifier of at least one participant, and
(b) the finishing position of the at least one participant in the race event.

12. The method of claim 1, further comprising the step of determining a payout for the bet when the result of the bet on the roulette game comprises a win.

13. The method of claim 1,
wherein the selected set of rules define how to determine the result of the bet on the roulette game given the at least one outcome; and
wherein determining the result of the bet on the roulette game comprises

14. The method of claim 1, wherein using the selected set of rules to determine the at least one outcome comprises using the selected set of rules and at least one parameter associated with the bet to determine the at least one outcome.

15. The method of claim 14,
wherein the at least one parameter associated with the bet comprises at least one finishing position in a race; and
wherein the at least one finishing position is selected by the user.

16. The method of claim 14, wherein the at least one parameter associated with the bet comprises at least one finishing position in a race; and
wherein the at least one finishing position is determined randomly by the computing apparatus.

17. The method of claim 14, wherein:
the sporting event comprises a race event having the total number of participants and a plurality of finishing positions, each participant comprising a numerical identifier;
the at least one parameter associated with the bet comprises an indication of at least one finishing position; and
using the selected set of rules to determine the at least one outcome comprises using the selected set of rules to determine the at least one outcome based at least in part on the numerical identifier of the participant that finished the race event in the at least one finishing position indicated by the at least one parameter associated with the bet.

18. The method of claim 1, wherein:
at least one parameter is associated with the bet;
the sporting event comprises a race event having the total number of participants and a plurality of finishing positions, each participant comprising a numerical identifier;
the at least one parameter associated with the bet comprises an indication of at least one finishing position;
the selected set of rules comprises a set of relationships, each relationship comprising a correlation between a possible outcome that represents a simulated roulette spin and at least one numerical identifier of a participant in the race event; and
using the selected set of rules to determine the at least one outcome comprises:
based at least in part on the at least one finishing position indicated by the at least one parameter associated with the bet, determining the at least one numerical identifier that corresponds to the at least one participant that finished the race event in the at least one finishing position; and
determining, based at least in part on the set of relationships and the at least one determined numerical identifier, the at least one outcome.

19. The method of claim 1, wherein the at least one outcome comprises at least one color.

20. The method of claim 1, wherein the least one outcome comprises at least one numerical value.

21. The method of claim 1, wherein the result of the bet comprises one of:
a win, and
a loss.

22. The method of claim 1, wherein the bet on the roulette game comprises at least one of:
a bet that the at least one outcome will be a specific color as specified by the user,
a bet that the at least one outcome will be a specific number as specified by the user, and
a bet that the at least one outcome will be one of a plurality of numbers as specified by the user, wherein the plurality of numbers are non-consecutive numbers.

23. The method of claim 1, wherein the bet on the roulette game comprises at least one of:
a bet that the at least one outcome will be a specific color as specified by the user,
a bet that the at least one outcome will be a specific number as specified by the user,
a bet that the at least one outcome will be one of two numbers as specified by the user,
a bet that the at least one outcome will be one of three numbers as specified by the user, a bet that the at least one outcome will be one of four numbers as specified by the user, a bet that the at least one outcome will be one of twelve numbers as specified by the user, and a bet that the at least one outcome will be one of an odd number and an even number, as specified by the user.

24. The method of claim 1, wherein the bet on the roulette game comprises a type of bet; and wherein the type of bet comprises at least one of:

a column bet, and a dozen bet.

25. The method of claim 1, wherein the bet from the user comprises a first bet from a first user;

wherein the at least one outcome comprises at least one first outcome; and wherein the method further comprises the steps of:

receiving from a second user a second bet on a roulette game;

the computing apparatus using the selected set of rules to determine, based at least in part on the at least one event result, at least one second outcome that represents a simulated roulette spin; and determining a result of the second bet based at least in part on the at least one second outcome.

26. The method of claim 25, wherein the result of the first bet is the same as the result of the second bet.

27. The method of claim 25, wherein the result of the first bet is different from the result of the second bet.

28. The method of claim 25, wherein the one first outcome and the one second outcome are the same.

29. The method of claim 25, wherein the one first outcome and the one second outcome are different.

30. An apparatus comprising:

at least one processor; and at least one memory device electronically coupled to the at least one processor, in which the memory device stores instructions which, when executed by the at least one processor, direct the at least one processor to at least:

receive from a user a bet on a roulette game;

receive at least one event result of a sporting event that comprises a total number of participants;

select a set of rules, from a plurality of sets of rules, based at least in part on the total number of participants in the sporting event, wherein the plurality of sets of rules are used for determining, based on event results of sporting events, outcomes that represent simulated roulette spins, the outcomes comprising at least one of:

numerical values, and colors, wherein at least a first set of rules of the plurality of sets of rules are used for determining outcomes based on sporting events that have a first total number of participants, wherein at least a second set of rules of the plurality of sets of rules are used for determining outcomes based on sporting events that have a second total number of participants, and wherein the first total number of participants is different from the second total number of participants;

use the selected set of rules to determine, based at least in part on the at least one event result, at least one outcome that represents a simulated roulette spin; and determine a result of the bet on the roulette game based at least in part on the at least one outcome.

31. The apparatus of claim 30, wherein the instructions, when executed by the at least one processor, further direct the at least one processor to at least determine a payout for the bet when the result of the bet on the roulette game comprises a win.

32. The apparatus of claim 30, wherein the bet on the roulette game comprises at least one of:

a bet that the at least one outcome will be a specific color as specified by the user, a bet that the at least one outcome will be a specific number as specified by the user, and a bet that the at least one outcome will be one of a plurality of numbers as specified by the user, wherein the plurality of numbers are non-consecutive numbers.

33. The apparatus of claim 30, wherein the bet on the roulette game comprises a type of bet; and wherein the type of bet comprises at least one of:

a column bet, and a dozen bet.

34. The apparatus of claim 30, wherein the sporting event is one of a plurality of sporting events; and wherein the instructions, when executed by the at least one processor, further direct the at least one processor to at least:

determine the one sporting event from the plurality of sporting events; and in response to receiving the bet from the user, assign the bet to the one sporting event such that the result of the bet is based at least in part on the event results of the one sporting event.

35. The apparatus of claim 34, wherein the instructions, when executed by the at least one processor, further direct the at least one processor to at least display to the user via a client device an indication that the user's bet is assigned to the determined sporting event.

36. The apparatus of claim 34, wherein each of the plurality of sporting events has a respective scheduled start time; and wherein to determine the one sporting event and assign the bet comprises to:

determine that the scheduled start time of the one sporting event as compared to the plurality of sporting events is next in time relative to a time that the bet is placed; and assign the bet to the one sporting event based at least in part on determining that the scheduled start time of the one sporting event as compared to the plurality of sporting events is next in time relative to the time that the bet is placed.

37. The apparatus of claim 34, wherein each of the plurality of sporting events has a respective total number of participants; and wherein to determine the one sporting event and assign the bet comprises to:

determine, from among the plurality of sporting events, that the total number of participants of the one sporting event is of at least a predetermined amount; and assign the bet to the one sporting event based at least in part on determining that the total number of participants of the one sporting event is of at least the predetermined amount.

38. The apparatus of claim 34, wherein each of the plurality of sporting events has a respective scheduled start time and a respective total number of participants; and wherein to determine the one sporting event and assign the bet comprises to:

determine, from among the plurality of sporting events, that the one sporting event, relative to a time that the bet is placed, is a next sporting event scheduled to start that has a respective total number of participants of at least a predetermined amount; and assign the bet to the one sporting event based at least in part on the determination.

39. A method, comprising the steps of:

receiving from a user a bet on a roulette game;

a computing apparatus determining a one sporting event from a plurality of sporting events;

in response to receiving from the user the bet on the roulette game, the computing apparatus assigning the bet to the determined sporting event such that a result of the bet on the roulette game is based at least in part on event results of the determined sporting event;

receiving at least one event result of the determined sporting event;

the computing apparatus obtaining from a memory device a set of rules, from a plurality of sets of rules, wherein the plurality of sets of rules are used for determining, based on event results of sporting events, outcomes that represent simulated roulette spins, the outcomes comprising at least one of:

numerical values, and colors, wherein at least a first set of rules of the plurality of sets of rules are used for determining outcomes based on sporting events that have a first total number of participants, wherein at least a second set of rules of the plurality of sets of rules are used for determining outcomes based on sporting events that have a second total number of participants, and wherein the first total number of participants is different from the second total number of participants;

the computing apparatus using the obtained set of rules to determine, based at least in part on the at least one event result, at least one outcome that represents a simulated roulette spin; and determining the result of the bet on the roulette game based at least in part on the at least one outcome.

40. The method of claim 39, further comprising the step of determining a payout for the bet when the result of the bet on the roulette game comprises a win.

41. The method of claim 39, wherein the bet on the roulette game comprises at least one of:

a bet that the at least one outcome will be a specific color as specified by the user, a bet that the at least one outcome will be a specific number as specified by the user, and a bet that the at least one outcome will be one of a plurality of numbers as specified by the user, wherein the plurality of numbers are non-consecutive numbers.

42. The method of claim 39, wherein the bet on the roulette game comprises a type of bet; and wherein the type of bet comprises at least one of:

a column bet, and a dozen bet.

43. The method of claim 39, further comprising the step of displaying to the user via a client device an indication that the user's bet is assigned to the determined sporting event.

44. The method of claim 39, wherein each of the plurality of sporting events has a respective scheduled start time; and wherein determining the one sporting event and assigning the bet comprises:

determining that the scheduled start time of the one sporting event as compared to the plurality of sporting events is next in time relative to a time that the bet is placed; and assigning the bet to the one sporting event based at least in part on determining that the scheduled start time of the one sporting event as compared to the plurality of sporting events is next in time relative to the time that the bet is placed.

45. The method of claim 39, wherein each of the plurality of sporting events has a respective total number of participants; and wherein determining the one sporting event and assigning the bet comprises:

determining, from among the plurality of sporting events, that the total number of participants of the one sporting event is of at least a predetermined amount; and assigning the bet to the one sporting event based at least in part on determining that the total number of participants of the one sporting event is of at least the predetermined amount.

46. The method of claim 39, wherein each of the plurality of sporting events has a respective scheduled start time and a respective total number of participants; and wherein determining the one sporting event and assigning the bet comprise:

determining, from among the plurality of sporting events, that the one sporting event, relative to a time that the bet is placed, is a next sporting event scheduled to start that has a respective total number of participants of at least a predetermined amount; and assigning the bet to the one sporting event based at least in part on the determination.

47. An apparatus comprising:

at least one processor; and at least one memory device electronically coupled to the at least one processor, in which the memory device stores instructions which, when executed by the at least one processor, direct the at least one processor to at least:

receive from a user a bet on a roulette game;

determine a one sporting event from a plurality of sporting events;

in response to receiving from the user the bet on the roulette game, assign the bet to the determined sporting event such that a result of the bet on the roulette game is based at least in part on event results of the determined sporting event;

receive at least one event result of the determined sporting event; obtain a set of rules, from a plurality of sets of rules, wherein the plurality of sets of rules are used for determining, based on event results of sporting events, outcomes that represent simulated roulette spins, the outcomes comprising at least one of:

numerical values, and colors, wherein at least a first set of rules of the plurality of sets of rules are used for determining outcomes based on sporting events that have a first total number of participants, wherein at least a second set of rules of the plurality of sets of rules are used for determining outcomes based on sporting events that have a second total number of participants, and wherein the first total number of participants is different from the second total number of participants;

use the obtained set of rules to determine, based at least in part on the at least one event result, at least one outcome that represents a simulated roulette spin; and determine a result of the bet on the roulette game based at least in part on the at least one outcome.

48. The apparatus of claim 47, wherein the instructions, when executed by the at least one processor, further direct the at least one processor to at least determine a payout for the bet when the result of the bet on the roulette game comprises a win.

49. The apparatus of claim 47, wherein the bet on the roulette game comprises at least one of:

a bet that the at least one outcome will be a specific color as specified by the user, a bet that the at least one outcome will be a specific number as specified by the user, and a bet that the at least one outcome will be one of a plurality of numbers as specified by the user, wherein the plurality of numbers are non-consecutive numbers.

50. The apparatus of claim 47, wherein the bet on the roulette game comprises a type of bet; and wherein the type of bet comprises at least one of:

a column bet, and a dozen bet.

51. The apparatus of claim 47, wherein the instructions, when executed by the at least one processor, further direct the at least one processor to at least display to the user via a client device an indication that the user's bet is assigned to the determined sporting event.

52. The apparatus of claim 47, wherein each of the plurality of sporting events has a respective scheduled start time; and wherein to determine the one sporting event and assign the bet comprises to:

determine that the scheduled start time of the one sporting event as compared to the plurality of sporting events is next in time relative to a time that the bet is placed; and assign the bet to the one sporting event based at least in part on determining that the scheduled start time of the one sporting event as compared to the plurality of sporting events is next in time relative to the time that the bet is placed.

53. The apparatus of claim 47, wherein each of the plurality of sporting events has a respective total number of participants; and wherein to determine the one sporting event and assign the bet comprises to:

determine, from among the plurality of sporting events, that the total number of participants of the one sporting event is of at least a predetermined amount; and assign the bet to the one sporting event based at least in part on determining that the total number of participants of the one sporting event is of at least the predetermined amount.

54. The apparatus of claim 47, wherein each of the plurality of sporting events has a respective scheduled start time and a respective total number of participants; and wherein to determine the one sporting event and assign the bet comprises to:

determine, from among the plurality of sporting events, that the one sporting event, relative to a time that the bet is placed, is a next sporting event scheduled to start that has a respective total number of participants of at least a predetermined amount; and assign the bet to the one sporting event based at least in part on the determination.

* * * * *